United States Patent
Lampert

(10) Patent No.: US 9,224,167 B2
(45) Date of Patent: Dec. 29, 2015

(54) SYSTEM AND METHOD FOR AIDING USER IN ONLINE SEARCHING AND PURCHASING OF MULTIPLE ITEMS

(71) Applicant: Aggregate Shopping Corp., Hollywood, FL (US)

(72) Inventor: Keith L. Lampert, Hollywood, FL (US)

(73) Assignee: AGGREGATE SHOPPING CORP., Hollywood, FL (US)

( * ) Notice: Subject to any disclaimer, the term of this patent is extended or adjusted under 35 U.S.C. 154(b) by 0 days.

(21) Appl. No.: 13/840,511

(22) Filed: Mar. 15, 2013

(65) Prior Publication Data

US 2014/0279252 A1     Sep. 18, 2014

(51) Int. Cl.
*G06Q 30/06* (2012.01)

(52) U.S. Cl.
CPC ................................ *G06Q 30/0633* (2013.01)

(58) Field of Classification Search
USPC ...................................................... 705/26, 27
IPC ..................................................... G06Q 30/06
See application file for complete search history.

(56) References Cited

U.S. PATENT DOCUMENTS

| | | | |
|---|---|---|---|
| 6,006,225 A | 12/1999 | Bowman | |
| 6,269,343 B1 | 7/2001 | Pallakoff | |
| 6,629,135 B1 | 9/2003 | Ross, Jr. et al. | |
| 6,882,981 B2 | 4/2005 | Philippe | |
| 6,993,572 B2 | 1/2006 | Ross, Jr. et al. | |
| 7,120,595 B2 | 10/2006 | Alexander | |
| 7,181,419 B1 | 2/2007 | Mesaros | |
| 7,637,426 B1 * | 12/2009 | Green | 235/383 |
| 7,756,753 B1 | 7/2010 | McFarland | |
| 7,774,234 B1 | 8/2010 | Kopelman et al. | |
| 7,818,399 B1 | 10/2010 | Ross, Jr. et al. | |
| 7,890,528 B1 | 2/2011 | Khoshnevisan | |
| 8,380,607 B2 | 2/2013 | Bollen et al. | |
| 2002/0032597 A1 * | 3/2002 | Chanos | 705/10 |
| 2002/0038255 A1 * | 3/2002 | Tarvydas et al. | 705/26 |
| 2002/0128920 A1 * | 9/2002 | Chopra | 705/26 |
| 2002/0198894 A1 | 12/2002 | Tamura | |
| 2003/0095141 A1 * | 5/2003 | Shah et al. | 345/735 |
| 2004/0249723 A1 | 12/2004 | Mayer | |
| 2005/0033639 A1 | 2/2005 | Myers | |
| 2007/0128889 A1 | 6/2007 | Goto | |
| 2007/0150368 A1 * | 6/2007 | Arora et al. | 705/26 |
| 2007/0226189 A1 * | 9/2007 | Piekos et al. | 707/3 |
| 2007/0299735 A1 * | 12/2007 | Mangalick et al. | 705/26 |

(Continued)

FOREIGN PATENT DOCUMENTS

| WO | WO 01/20514 | 3/2001 |
|---|---|---|
| WO | WO 03/027913 | 4/2003 |
| WO | WO 2005/010775 A1 | 2/2005 |

OTHER PUBLICATIONS

BatchSearch, www.batchsearch.com, © 2012, Computer Locators International, Inc.

(Continued)

*Primary Examiner* — Rob Pond
(74) *Attorney, Agent, or Firm* — Baker & Hostetler LLP

(57) ABSTRACT

A system and method for searching for and/or purchasing multiple items on the Internet is provided. The system identifies a plurality of purchasing alternatives based on predetermined criteria and allows the consumer to select from among the purchasing alternatives to purchase the desired items.

25 Claims, 21 Drawing Sheets

(56) References Cited

U.S. PATENT DOCUMENTS

| | | |
|---|---|---|
| 2008/0133426 A1 | 6/2008 | Porat et al. |
| 2008/0189190 A1 | 8/2008 | Ferber |
| 2010/0082447 A1* | 4/2010 | Lin et al. .......................... 705/26 |
| 2011/0154252 A1* | 6/2011 | Canfield et al. ............... 715/808 |
| 2011/0264560 A1 | 10/2011 | Griffiths et al. |
| 2012/0215656 A1* | 8/2012 | Chen ...................... G06Q 30/06 705/26.8 |
| 2012/0233142 A1 | 9/2012 | Lawrence |
| 2012/0316988 A1 | 12/2012 | Lampert |
| 2013/0030957 A1 | 1/2013 | Tuflija |
| 2013/0103609 A1 | 4/2013 | Kirshenbaum et al. |
| 2013/0117149 A1* | 5/2013 | Gupta .......................... 705/26.8 |
| 2014/0032264 A1 | 1/2014 | Kalikivayi |

OTHER PUBLICATIONS

Yuan, S., and Liu, A., "Next-Generation Agent-Enabled Comparison Shopping", Expert Systems with Applications, May 2000, 18(4), 283-297.

U.S. Appl. No. 13/841,106, filed Mar. 15, 2013, Keith Lampert.

U.S. Appl. No. 13/841,740, filed Mar. 15, 2013, Keith Lampert.

U.S. Appl. No. 13/842,325, filed Mar. 15, 2013, Keith Lampert.

"Welcome to Crowd Source Deals", Crowd Source Deals, www.crowdsourcedeals.com, 2013, 2 pages.

U.S. Appl. No. 14/180,867, filed Feb. 14, 2014, Lampert et al.

* cited by examiner

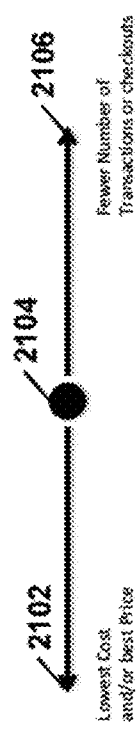

SYSTEM AND METHOD FOR AIDING USER IN ONLINE SEARCHING AND PURCHASING OF MULTIPLE ITEMS

CROSS-REFERENCE TO RELATED APPLICATIONS

The subject matter of this application is related to that of co-pending, commonly assigned, U.S. patent application Ser. No. 13/495,694, filed on Jun. 13, 2012, entitled "Method and System for Online Searching and Purchasing of Multiple Products Simultaneously," now U.S. Patent Application Publication No. 2012/0316988 A1, the entirety of which is incorporated herein by reference.

FIELD

The present invention pertains generally to on-line product searching and purchasing. More particularly, the invention pertains to systems and methods for on-line searching and purchasing of multiple items.

BACKGROUND

On-line shoppers typically shop for one item at a time, even though they may desire to purchase more than one item or service ("item") in a single on-line shopping session. For example, an on-line shopper may be in the market for a shirt, a watch and a pair of jeans. This shopper has various options. She may visit a website such as amazon.com, serially search for each item, place her selections in the shopping cart, and then check out. Or, she may visit a different website for each item of interest, e.g., macys.com for the shirt, amazon.com for the watch, and gap.com for the jeans, and place each order separately at each website. Alternatively, this shopper may use a search engine such as google.com or bizrate.com, to search for on-line vendors, product choices and prices or cost for each item, and thereafter locate and purchase each item separately at each website.

The available options for shopping for multiple items on-line can be frustrating, time consuming and unsatisfying, in part, because the shopper must engage in serial searching (either at one website or across multiple websites), consider best price, lowest cost (including shipping costs), vendor ratings, product ratings and reviews, sales tax considerations, and/or the least number of transactions, and/or place her orders at different websites. The shopper may also need to determine various alternatives available to her for purchasing the multiple items and then decide which of the various alternatives is the most favorable to her. In addition, a cost conscious shopper will frequently visit coupon and/or promotional code websites, such as tjoos.com, to locate a coupon (or be advised that a coupon is available to make the purchase) to lower her purchase price or cost. In this case, she needs to copy the coupon code (if available) from the coupon website, and then paste it into the coupon code box of the website from which she is making the purchase. Likewise, she may need to search for rebate information, either at the vendor's or manufacturer's website, then separately obtain the rebate information.

The present invention overcomes these, and other on-line shopping problems by providing a web-based system and method wherein a user, such as an on-line shopper, who wishes to search for, browse or purchase multiple items, may enter or select all of the items she wishes to consider for purchase, or actually purchase, at one website, and wherein the system and method of the website automatically identifies various purchasing options available to the user, provides an opportunity for the user to select a purchasing option, and allows the user to purchase the multiple items in a single transaction via the website, or by directing the user to the vendor website(s) to complete her purchase.

SUMMARY

There is provided a system and method whereby a server aids a user, such as a shopper, in the search for and purchase of multiple items. The server communicates with a client internet enabled device so as to allow the user thereof to enter information descriptive of the items she is interested in searching for and/or purchasing. The server searches for candidate items that correspond to the descriptions entered by the user and presents the results to the user. Interactively with the server, the user is given the opportunity to refine the results presented by the server so as to narrow the results to specific items that the user may wish to purchase. These items define a shopping list. The server analyzes the shopping list and determines various purchase alternatives options available to the user for purchasing the items. These purchase options are presented to the user and the user is given an opportunity to select one of them. The purchase options may include options such as lowest overall cost (including transaction costs) to purchase the multiple items, fewest number of transactions required to purchase the multiple items, and a system generated option which produces a system determined optimized option. In response to the user's selection, the server directs the user through a checkout process for purchasing each of the multiple items, either by way of directing the user to each vendor's website, or by way of a single checkout at the server. The system and method may also include means for presenting the user with coupons and promotional code (collectively "coupons") and rebate information available for the items, and for applying loyalty cards and redemption points or bonuses specific to the vendors that the user has selected for purchasing the items.

BRIEF DESCRIPTION OF THE DRAWINGS

FIG. 21 illustrates an exemplary slider bar to customize the criteria for the optimized search function.

DETAILED DESCRIPTION OF ILLUSTRATIVE EMBODIMENTS

Figure 1:
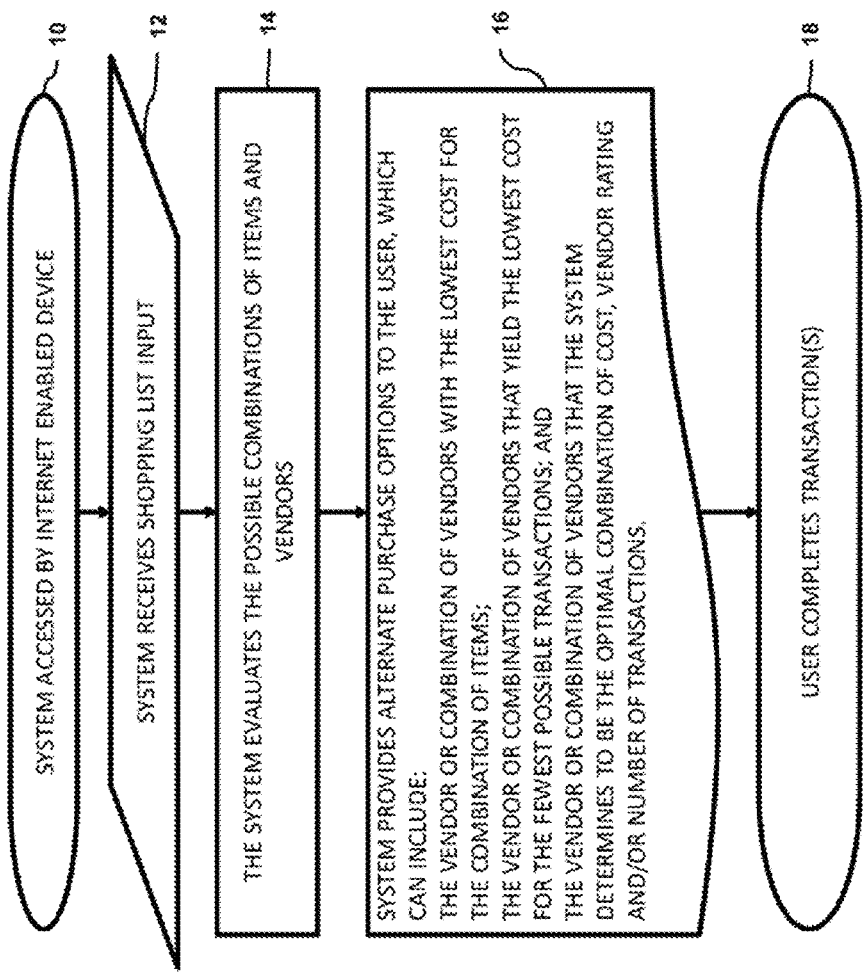
FIG. 1 is a flow chart illustrating an exemplary embodiment of an online searching and shopping method in accordance with the present invention.

As used in this description, "user" includes but is not limited to an on-line shopper, a person browsing for items for possible purchase, a person looking for the best deals, a person doing on-line comparison shopping, a person creating a wish-list or a shopping list ("list"), a person who wishes to engage in a customized shopping experience, and the like. The terms "shop" and "shopping" include browsing, searching for items, creating wish-lists and shopping lists, performing price or cost comparisons, purchasing, and the like. A "shopper" is a person or entity who shops or engages in shopping. "Items" refers to items and services, and the like.

Referring to the drawings, where like numerals represent like elements, there is illustrated an exemplary system and method for searching, browsing, shopping, creating shopping or wish lists for, and purchasing multiple items online from third parties, which, in the exemplary embodiment, is carried out via either a website or an application on an Internet enabled device, such as a smart phone, tablet or a computer that runs applications, e.g., a computer running Windows 8 applications.

Figure 3:
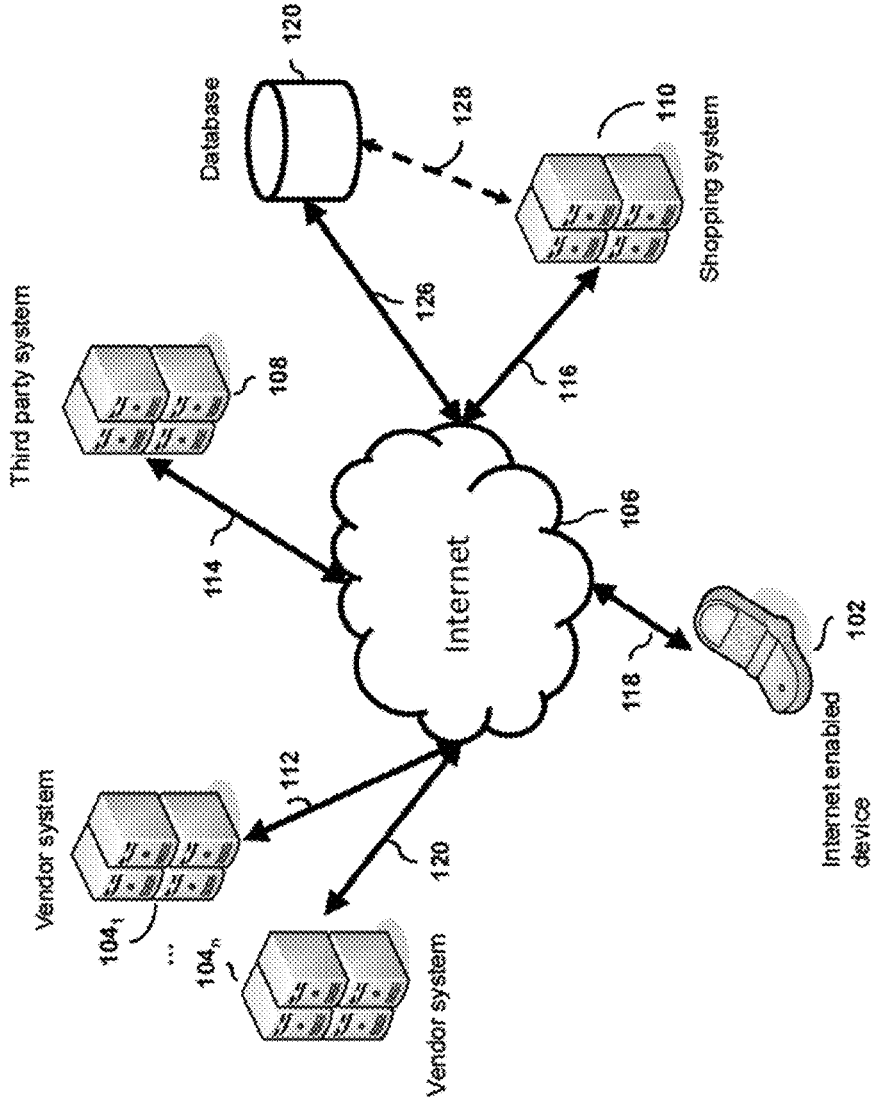
FIG. 3 illustrates hardware and network details of an exemplary system for carrying out the methods shown and described herein.

FIG. 3 illustrates an exemplary network based system that may be employed to carry out the invention. The system comprises a shopping system 110, such as a server that carries out the functionality described herein, an Internet enabled device 102 such as a computer or mobile device that functions as a client, an on-line third party system 108 that provides vendors and item data, a database 120, and one or more on-line vendor systems $104_1 \ldots 104_n$, that offer items online, all of which can communicate with system 110 via the internet 106. Examples of vendor systems 104 include websites such as amazon.com, overstock.com, macys.com, walmart-.com, gap.com, etc. Examples of vendor systems 104 also include brick and mortar stores such as Walmart, Target, Staples, and the like. Examples of third party systems 108 include websites that search for on-line vendors, item choices and/or pricing, such as dealcatcher.com, pricegrabber.com, nextag.com, google.com, bizrate.com, etc. As described below, the system 110 functions as an intermediary between users, such as shoppers, and on-line vendor systems 104, and also functions as a referral source for the on-line vendor systems 104. As also described below, in accordance with the preferred embodiment of the invention, items identified using the system 110 are purchased solely from or via the third party vendor systems 104, as compared, for example, to a site such as amazon.com which both sells items from its own warehouses and via on-line vendors.

Database 120 stores information retrieved from, and/or pushed to the database by, systems 104, 108, for use by, system 110. Database 120 may be remote from the system 110, and communicate therewith via the internet or other network, or may be resident with or local to the system 110 as shown by the dashed line 128. The information in database 120 may be obtained by means of FTP data feeds, real-time HTTP requests, crawling systems, and/or directly from the systems 104, 108. Information concerning items, item specifications, discounts, prices or cost, quality, vendor rating, user reviews, item reviews, item ratings, sales tax information, coupon information, rebate information, etc. is stored in the database 120. Preferably, system 110 regularly updates this information in real-time, on a periodic schedule, or as a batch process. Database 120 and systems 104 and 108 may be synchronized so that any change in the information in systems 104,108 is automatically reflected in database 120. System 110 preferably sorts the information in a manner that enables efficient searching in response to the shopping information received from the user.

A user who wishes to shop online accesses the system 110 via the Internet using her Internet enabled device 102, either directly, by entering the URL of the system 110, for example, via a browser, or via a specialized resident shopping application that has been loaded onto her device 102, for example, by the system 110. Thus, the system 110 can be accessed using a conventional browser, or, via a resident shopping application that the user has downloaded, e.g., from the system 110, from an app store or from any other location that may be used. At her device 102, the user may input information relating to her shopping list, via an online form provided by the system 110, via a form that is part of the resident application, or by other means such as e-mail or via a social media website. The user may also provide personal information, and/or information relating to preferred vendors, favorite colors, size of the item, images of items, and the like. The user may also provide information regarding the user's loyalty cards or membership information from one or more vendor systems 104 that may enable the system 110 to search for and alert the user of applicable rebates available for items on the list. For example, the user may provide membership information from Costco and the system 110 may use the membership information if the user is searching for a product and it is on sale at Costco. Alternatively, the information that is input at the user end may be obtained from a camera on the device 102, a previously taken photograph, a link to an image, and/or a bar code or QR code scanned using the device 102. The information may also relate to a person for whom the user desires to purchase an item. This information may then be directed to the system 110. Upon receipt, the system 110 uses the information to search for the shopping list items using vendor systems 104, third party system 108 and/or database 120. Those skilled in the art will appreciate from the description that follows that some of the functionality described as being carried out on system 110 may, in the case of a mobile device or other device that runs apps, be carried out on the app instead of system 110.

If the user uploaded images of items (e.g., from the camera on her device 102) or pasted links to images of items, instead of using search terms to identify items of interest, the system 110 processes the images to identify them. The user may have also entered a description of a person for whom she wishes to purchase an item, in which case system 110 may analyze past purchases of that person, or a wish list of the person, or demographics of the person, to recommend a product. For example, the user might enter "birthday gift for 10 year old girl," and the system 110 may recommend popular items for that demography such as (1) "Easy-bake Oven," (2) a "Hello Kitty" clock, or (3) "Monopoly" board game. Or, the user might enter "birthday gift for Joe Smith," the system 110 may analyze Joe Smith's purchase history or wish list, determine that he has an affinity for photography, and recommend potential photography items, such as, (1) art of photography books, (2) camera tripod stand, and/or (3) camera lens cleaning kit.

Upon receipt of the shopping information from the user, the system 110 may return candidate items, query the user to refine the search, and/or generate a report that provides purchase options to the user. Candidate items are items that the system 110 has determined correspond to the descriptive information that the user provided. The system 110 then guides the user through a process of making purchase selections, checkout and payment, shipping etc., as described below, in such a manner that the user is given the option to purchase from: (i) the vendor or a combination of vendors with the best price and/or lowest overall cost for the combination of items (i.e. the best product price may not always provide the lowest overall cost after transaction fees, shipping costs, etc.; best price or lowest cost could include, but is not limited to, all the elements of cost such as product price, shipping cost, tax, and the like); (ii) the vendor or combination of vendors that yield the lowest cost for the fewest possible transactions or checkouts; or (iii) the vendor or combination of vendors that system 110 determines to be the optimal combination of cost, vendor rating and/or number of transactions. Screen shots for an exemplary website configured to carry out an embodiment of the invention are provided and described below.

Figure 14:
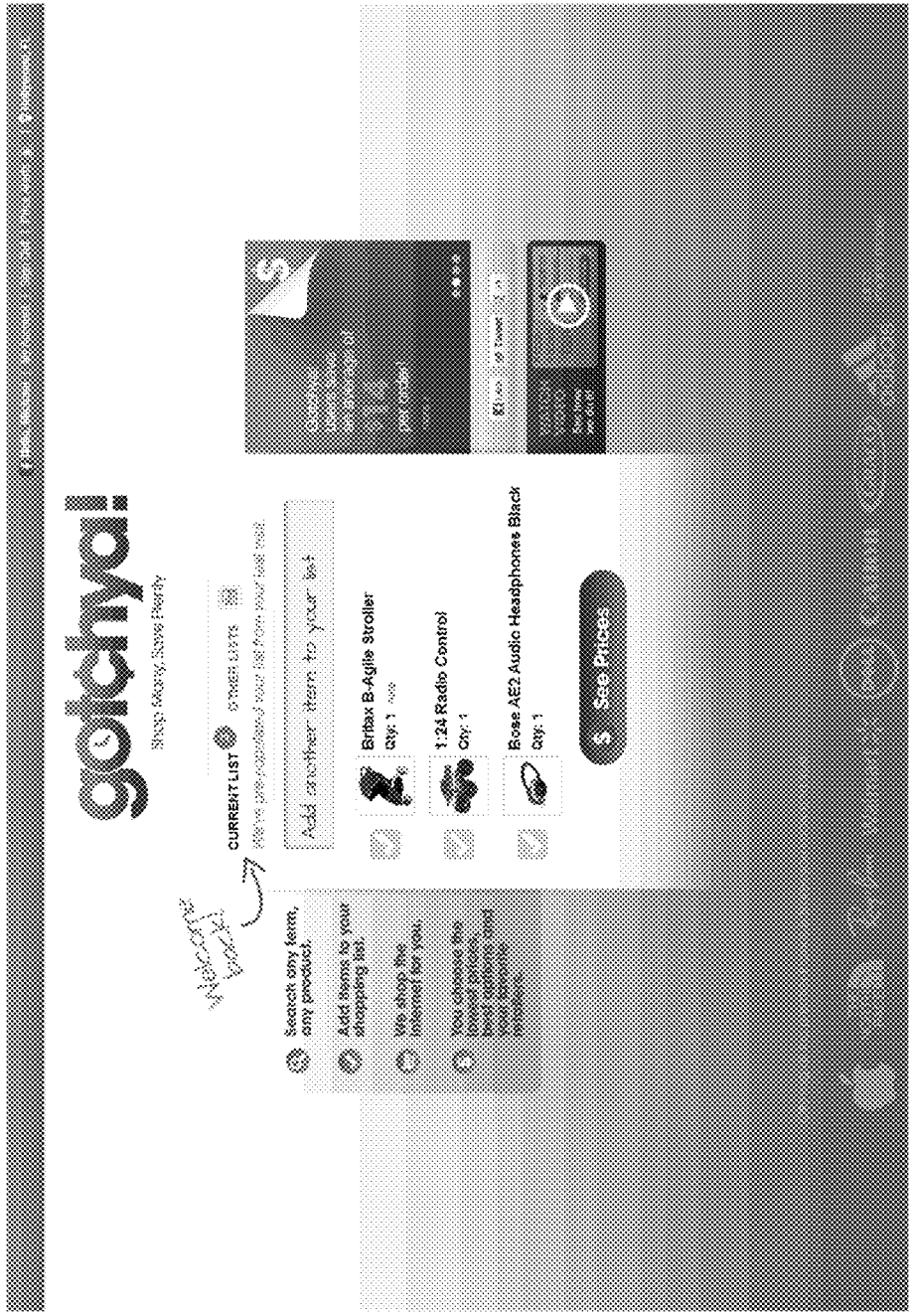
FIG. 14 is a screen shot of an exemplary landing page of a website wherein a user may add items to a shopping list.

FIG. 1 illustrates, at a high level, an exemplary embodiment of the above described shopping method. Using a form provided by system 110, or by a resident app, the user provides her shopping list via her device 102, which is then sent to system 110 (steps 10, 12). The creation of the shopping list may be facilitated by system 110. For example, as shown in the exemplary screen shot of FIG. 14, the user may enter multiple search terms into the form, each descriptive of the items she wishes to purchase, and the system 110 may then perform a search for items corresponding to the search terms. Information descriptive of the search terms may include images, QR codes, descriptions of items, audio data describing the item, and the like. In an iterative process, candidates resulting from this search may be displayed to, and refined by, the user so as to narrow the candidates and allow the user to select one or more for purchase. FIG. 14 illustrates that a user has already selected three items, and that she is being given the option to search for more.

Figure 2:
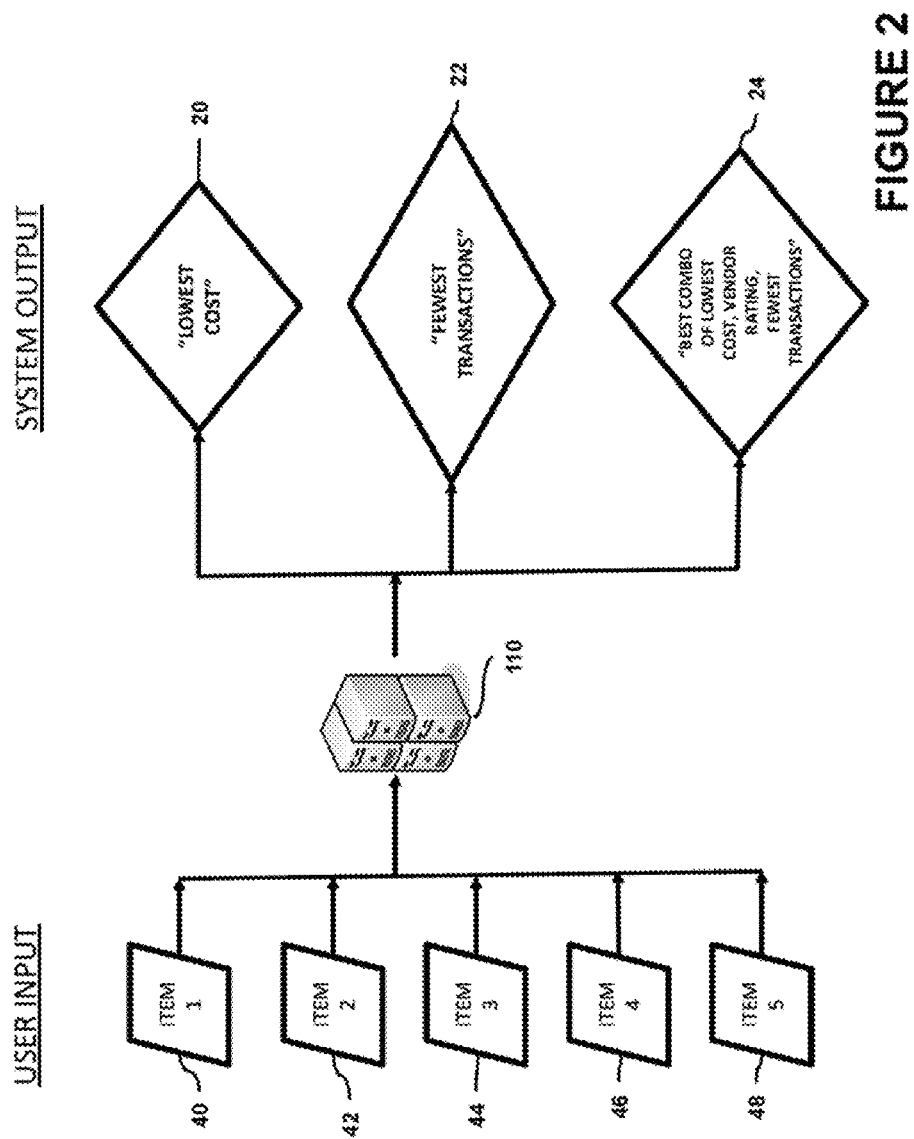
FIG. 2 is a high level diagram illustrating an exemplary workflow in accordance with the present invention.
Figure 15:
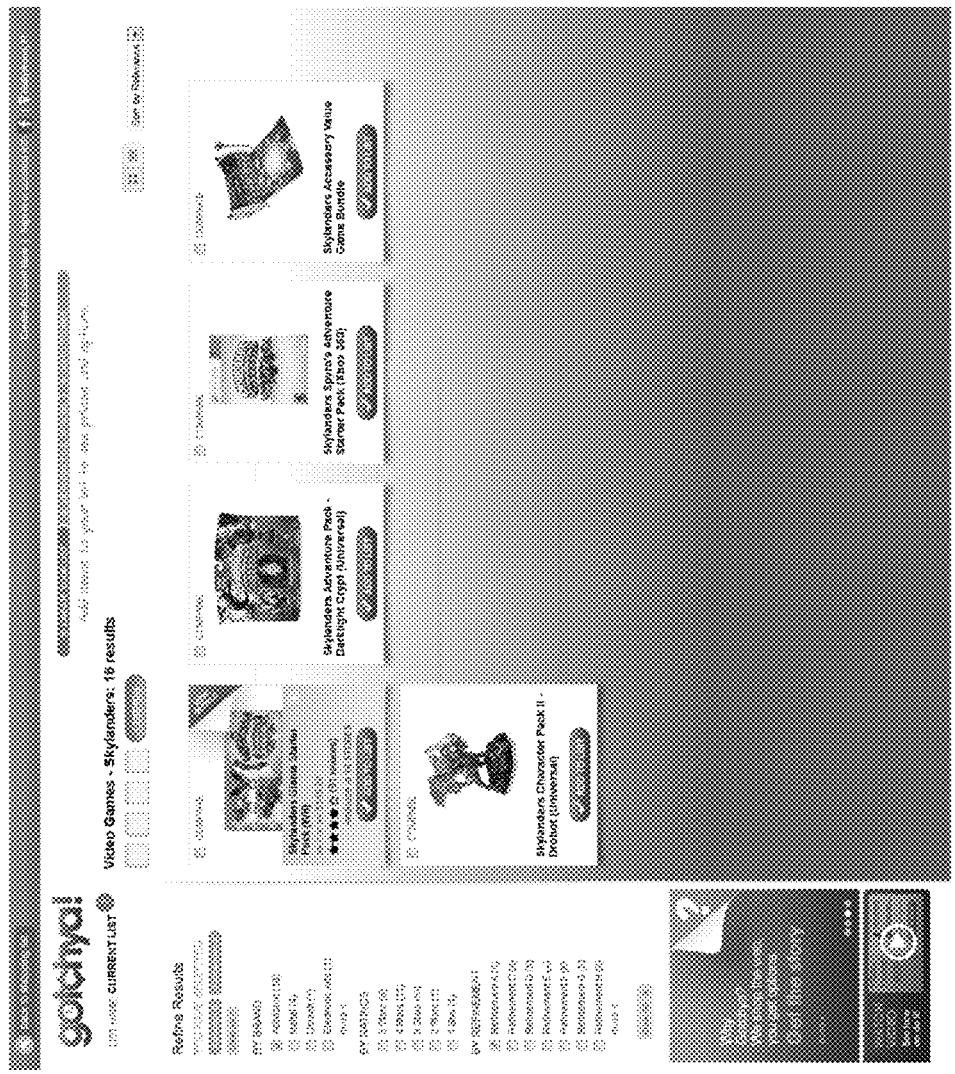
FIG. 15 is a screen shot of an exemplary web page of a web site where candidates are displayed and wherein a user may refine the candidates and make item selections.

With reference to FIG. 2, suppose that the user is interested in purchasing five items (i.e., items 40-48 of FIG. 2). In this case, the user enters the first of five search terms, descriptive of the item, into the form and then system 110 searches for the items offered by the various online vendors 104 that match the search term entered by the user. For example, if the search term is "shirt," the system 110 might return thousands of candidates, e.g., in the form of online vendors selling shirts. Consequently, the system 110 provides the user with the option to further refine the search term to narrow the candidates for the search term entered. For example, the user may then enter further search criteria (or select further limiting terms from a menu or link), such as a particular brand, color and/or size of shirt to which the candidates should be narrowed. The exemplary screen shot of FIG. 15 is illustrative. Once additional search criteria have been provided, the candidates are narrowed further. Thus, for example, the user may refine the search to be very specific (e.g., black, large, Calvin Klein shirt) for each item on the user's shopping list. This process will then be repeated for each of the remaining four items that the user desires to purchase to complete their shopping list. Once the user has completed her shopping list, she may then click on a "search," a "go," or a "See Prices" soft button on a GUI displayed on device 102. (See FIG. 14). If desired, the search query may be structured so that search terms may be deleted (i.e., "closed") by selecting them, as well. In this way, the system 110 performs searches (iteratively, if desired) based on the inputs provided by the user into the online form of system 110. The shopping list may be stored at the system 110, the database 120 or on the internet enabled device 102.

Figure 17:
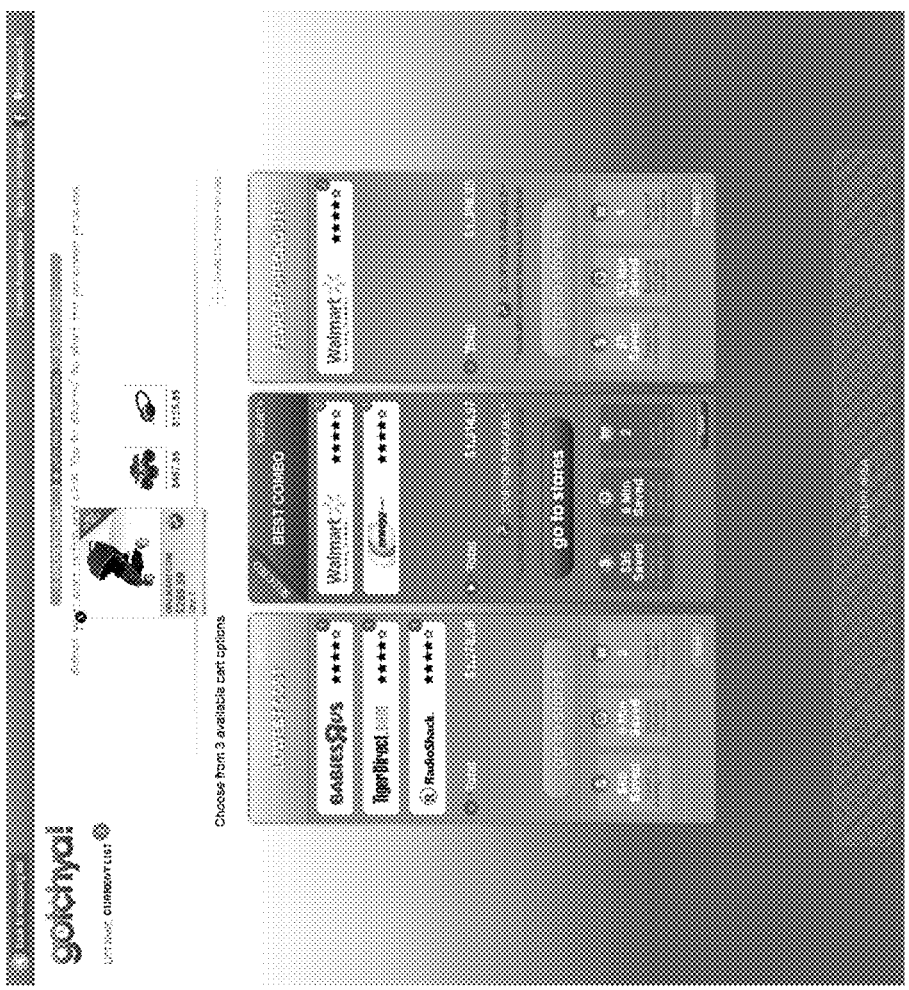
FIG. 17 is a screen shot of an exemplary web page of a web site where alternative options for purchasing selected items may be displayed.

Referring back to FIG. 1, once the user has refined the candidates, and for each vendor from which the selected items are found to be available, the system 110 compares certain predefined attributes, including, but not limited to, price or cost, shipping cost and seller rating (step 14), and as shown at step 16, provides alternative purchase options. The system 110 may also present information, such as, applicable rebate information or the like along with the alternate purchase options to assist the user with deciding on the purchase. The alternative purchase options may include, but are not limited to:

a) the single vendor or combination of vendors that offer(s) the lowest cost, the lowest total cost, and/or the best price (i.e., the total price taking into account item price, available discounts, sales tax and shipping costs) for each item on the user's shopping list, regardless of the number of vendors involved (scenario 20 of FIG. 2). For example, this may be five or fewer different vendors (one for each of the five shopping list items), each of which offers the lowest total price or cost for their respective item;

b) the single vendor or combination of vendors that offers the fewest possible (i.e., lowest number of) purchase transactions for ordering the five items on the user's shopping list (scenario 22 of FIG. 2). For example, this option may display pricing or an optimized purchase option for a single vendor that offers all five items (i.e., a single transaction), instead of a purchase option having two vendors that, cumulatively, offer the five items at a lower total price or lowest total cost, but in separate transactions. If desired, however, lowest total price or cost may be used to distinguish between vendors or combinations of vendors that offer the same number of transactions or checkouts (i.e., if three vendors each sell all five items, the optimized purchase option may be prepared for the vendor that offers the five items at the lowest total price or cost); or, c) the vendor or combination of vendors that the system determines (as described below) to be the most optimal combination of total price or cost, vendor rating and/or total number of transactions or checkouts (scenario 24 of FIG. 2). Alternately, the system may provide a purchase option optimizing only two of the above variables (i.e., best price or lowest cost for the fewest number of transactions or checkouts; best price or lowest cost from the vendors having the highest ratings; fewest number of transactions or checkouts from the vendors having the highest ratings; etc.). The exemplary screen shot of FIG. 17 illustrates one manner in which these options may be presented to the user, along with items that the user has selected for purchase.

If the user is not satisfied with the alternative purchase options presented by the system 110, the user may elect to have the system 110 present other purchase options. Thus, the system 110 may be programmed to recognize other purchase options that the customer has employed or requested in the past, and to employ the criteria used in connection with those purchase options for selecting and presenting alternative purchase options. Additionally, the system 110 may utilize customer history as criteria for selecting and presenting alternative purchase options. For example, the system 110 may provide greater weight towards vendors that the user has purchased from previously or repeatedly, based upon user weighting (described below) or for which the user has provided a favorable rating or has selected as a favorite vendor. In addition, the user may also edit the purchase options to select from other vendors systems 104.

Figure 18:
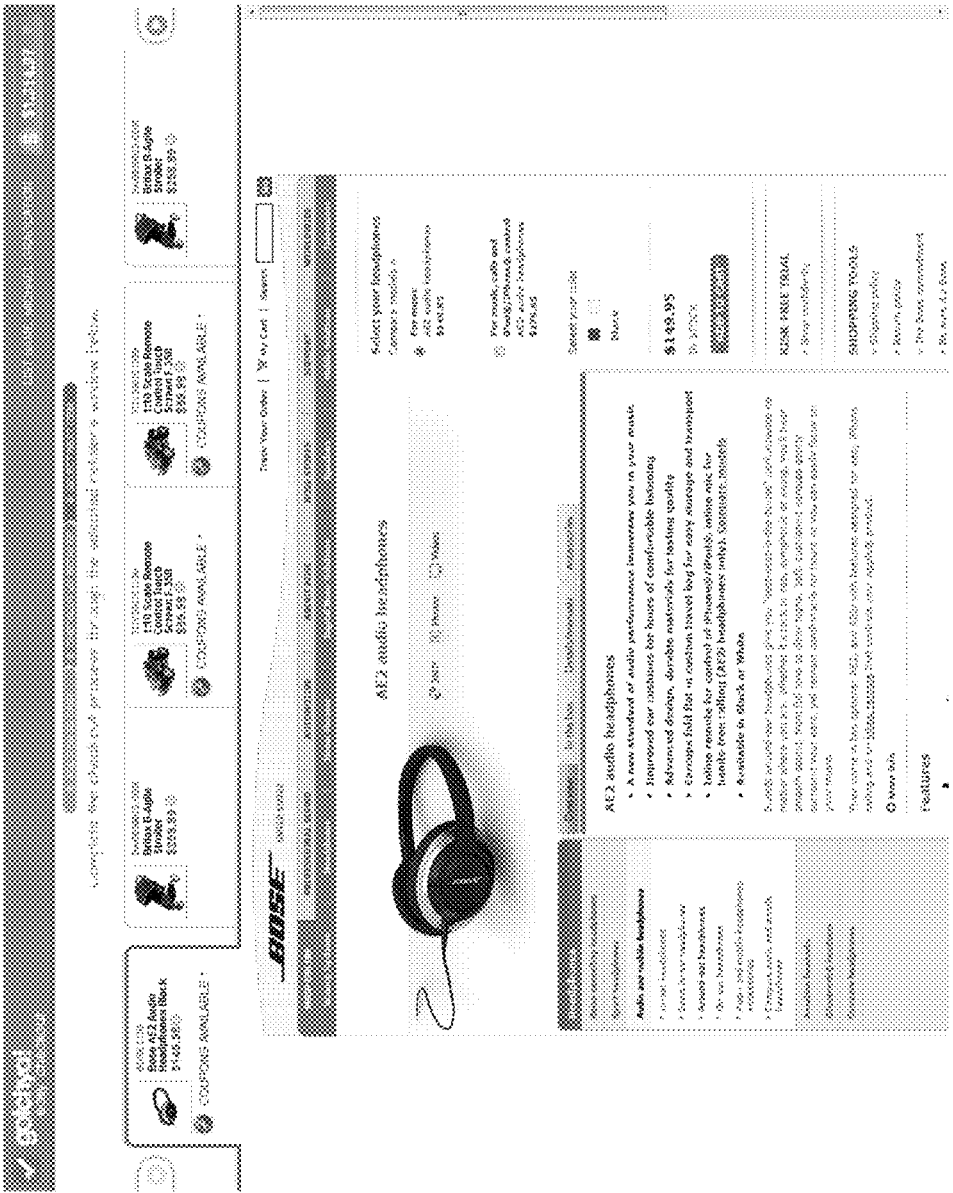
FIG. 18 is a screen shot of an exemplary web page of a web site employing a plugin or browser application for aiding the checkout process.

The user then selects one of the purchase options presented by the system 110 and may then proceed with the purchase. (Step 18). The purchase may be accomplished by either directing the user to the website of each of vendor system 104 associated with the purchase option selected by the user, for checkout at that vendor website, or at system 110, via its own checkout system. In the former case, the device 102 may employ a plugin or browser application, provided by the system 110, which, at the time of purchase, redirects the user to the vendor 104's website for each vendor selected for a purchase and can populate the checkout page thereof with the information necessary to consummate the purchase, such that the user consummates the purchase at the vendor 104's website. In the latter case, the system 110 may provide the user with a single checkout transaction for the multiple products and vendors. In this case, the system 110 acts as a gateway to manage the process of the payments with the vendors 104 and to consummate the purchase of the items. FIG. 18 is a screen shot of an exemplary web page implementing the former case and illustrates how the plugin or browser application redirects the user to the vendor 104's website (in the illustrated case, bose.com) while retaining the template of the web page employed by system 110. It will be seen that the other items awaiting checkout are listed at the top of the page, along with coupon information.

Figure 4:
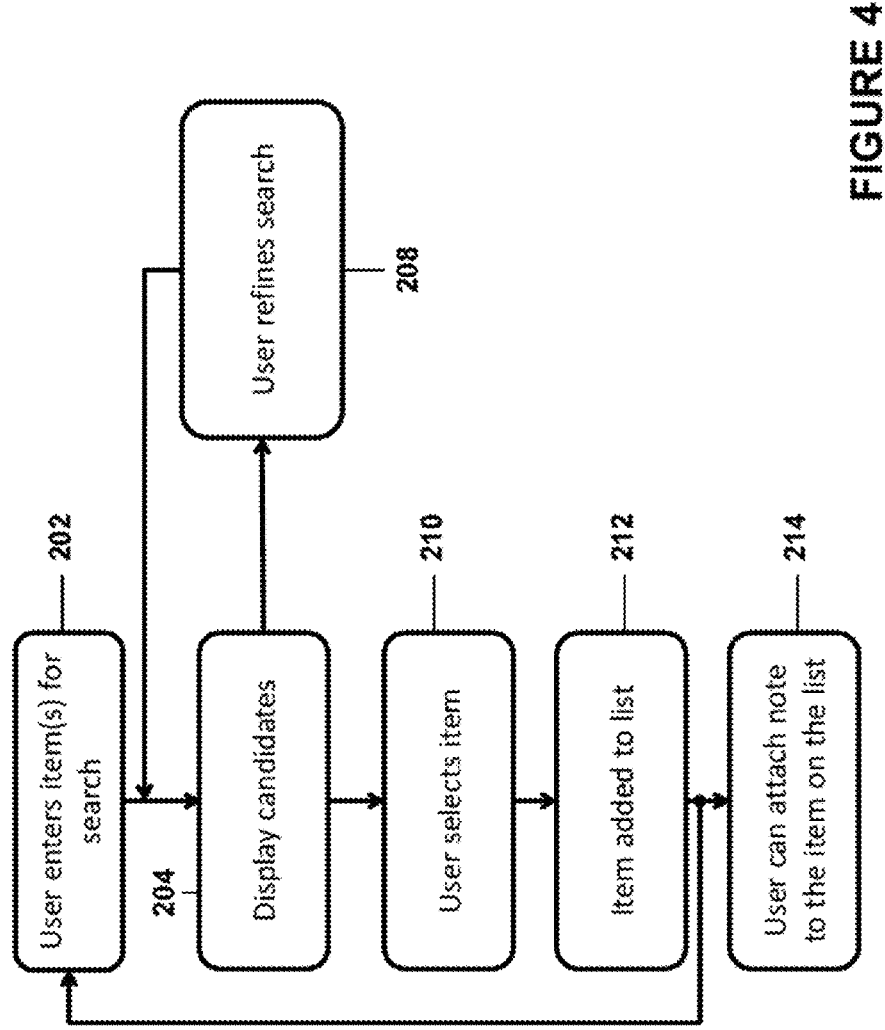
FIG. 4 illustrates an exemplary method by which a user may search for and select items for potential purchase in accordance with the invention.
Figure 16:
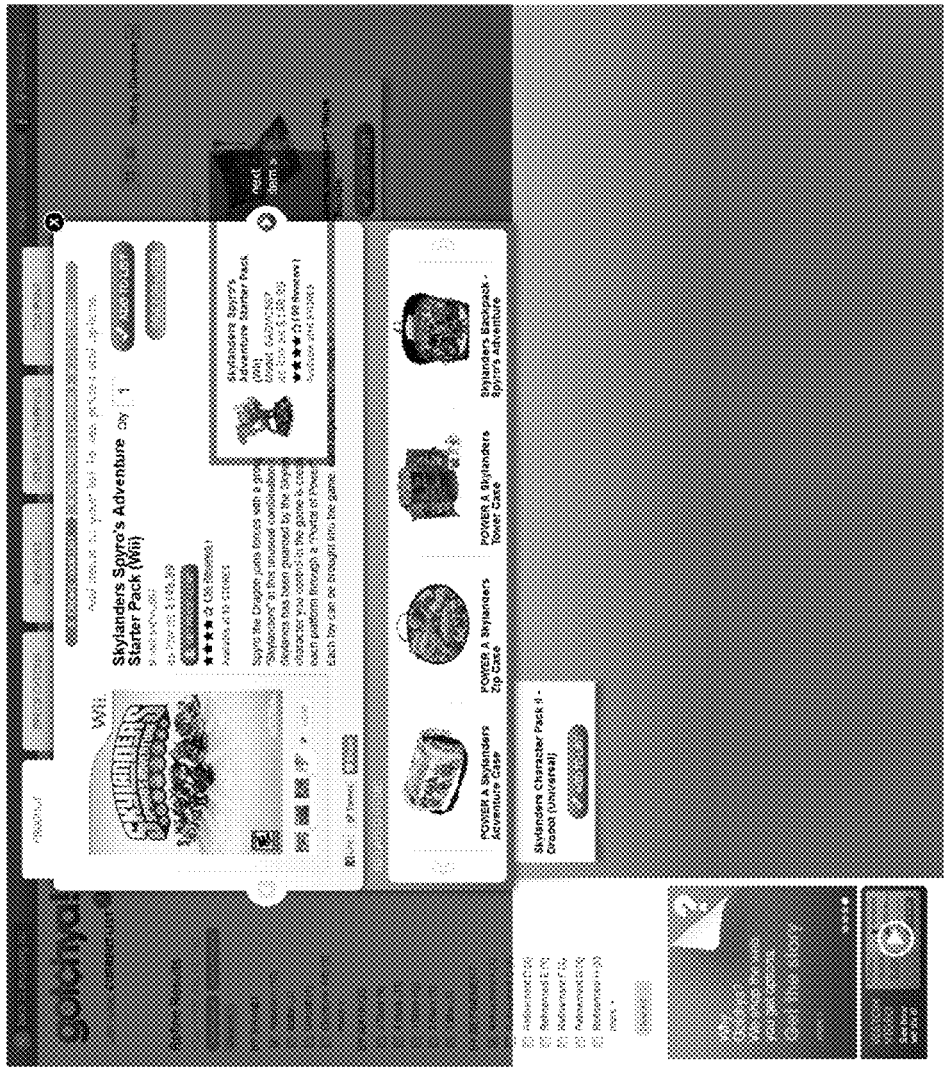
FIG. 16 is a screen shot of an exemplary web page of a web site where details of a selected item in the search may be displayed.

FIG. 4 is a flow diagram illustrating exemplary details for assisting a user in defining the items to be searched and for refining the selection to arrive at candidate items. As shown, the system 110 receives information indicative of items to be searched from the user via device 102. (Step 202; see also FIG. 14). The system 110 displays candidate items and allows the user to further refine the results. (Step 204; see also FIG. 15). The order in which candidate items are displayed may be by popularity, historical analysis, and the like. For example, if the user entered "Skylanders" in the search form, the system 110 may display different Skylanders products that the user may be interested in purchasing. The candidate items selected for display may be based on the user's past purchases, a wish list, a user's profile, system recommendations, price, ratings, etc., or a combination thereof. The user may then click on the candidates displayed (e.g., one of the Skylanders items shown on FIG. 15) so as to refine the search to specifically search for "Skylanders Spyro's Adventure Starter Pack (Wii)." The system 110 may also display other information about each candidate item, such as cost, discounts, rebate information, price-ranges, product specifications, item image, item rating, associate vendors 104 where the candidate item is available, and the like. For example, as shown in FIG. 16, the system 110, or the resident app, may allow for pop-ups containing this information when the user hovers over or touches one of the candidate items displayed in FIG. 15, or over a "next" or "previous" button; the pop-ups may also preview information, such as, information about the next candidate item, its cost, image of the candidate item, item rating, associate vendors 104 where the candidate item is available, rebate information, and the like.

As further illustrated in FIG. 4, if the user selects an item, (step 210), the product is added to the shopping list (Step 212). The user may then enter more items for search. (Step 202). The user may also be able to attach notes or other information to the item on the list. (Step 214). The list may be saved for later access and editing by the user, or by a third party as herein described. In the process of creating the list, the user may compare candidate items, as is commonly known, as shown in FIG. 15.

Figure 5:
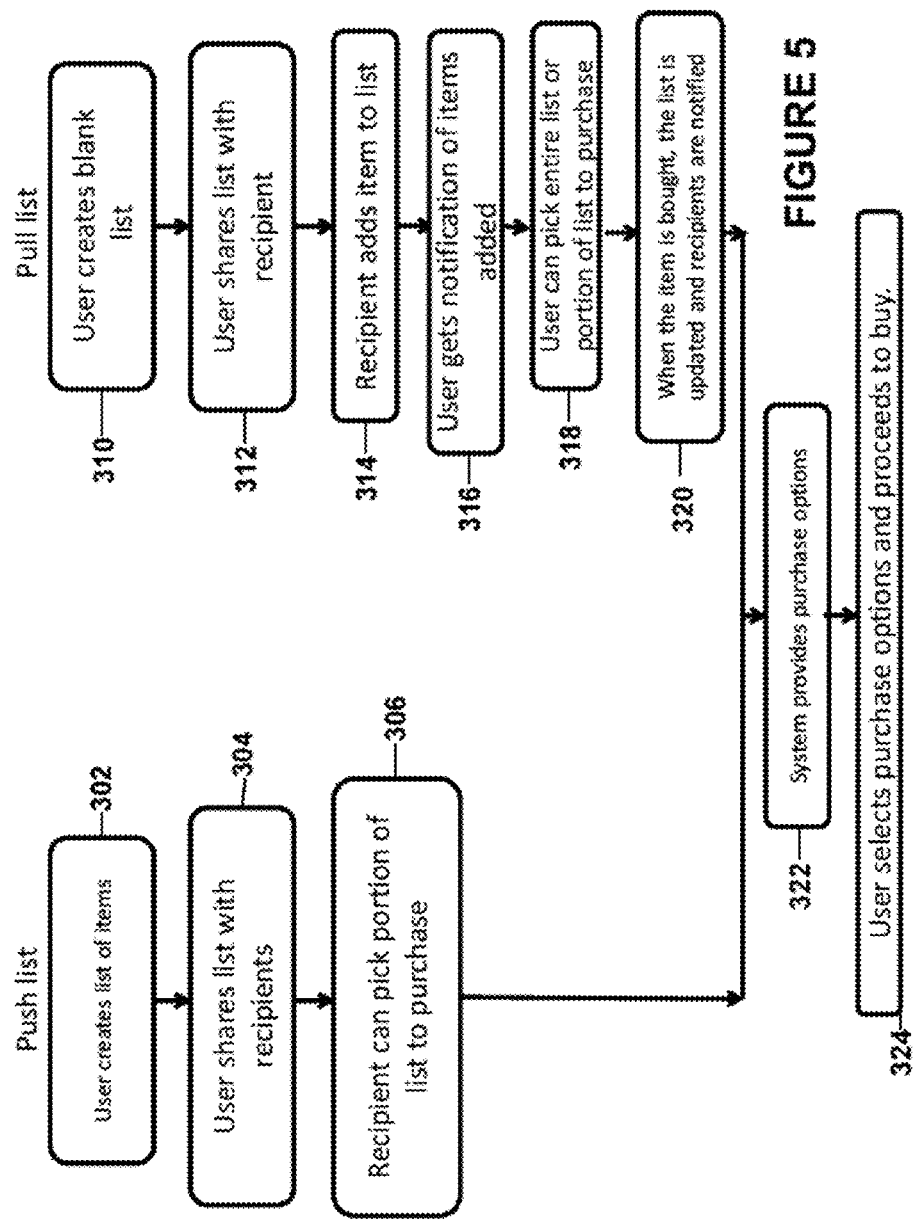
FIG. 5 illustrates an exemplary method by which a user may create and share a shopping list at a website, or by using an Internet enabled device based application, in accordance with the present invention.

FIG. 5 illustrates various approaches that may be employed to create a list of items to search on the system 110. The user may create a list that can be shared with designated recipients (e.g., by e-mail, in app, etc.) so that the recipients can select one or more of the items for search and purchase (Steps 302, 304, 306, 322, 324). The recipients may also edit the list. The user may also create a blank list and solicit a list of items from designated recipients (e.g., by e-mail, in app, etc.) that can be run on the system 110 by the user for search and purchase (Steps 310, 312, 314, 316, 318, 320, 322, 324). The user may be notified, e.g., by e-mail, that someone has added an item or items to the blank list (step 316). The user may select the entire list or specific items from the list that she would like to purchase (Step 318). In each case, the recipient or the user may select items for purchase based on the criteria described above. Once an item has been purchased, the shopping list is updated to remove the purchased items, and the recipients may be notified. (Step 320).

Figure 6:
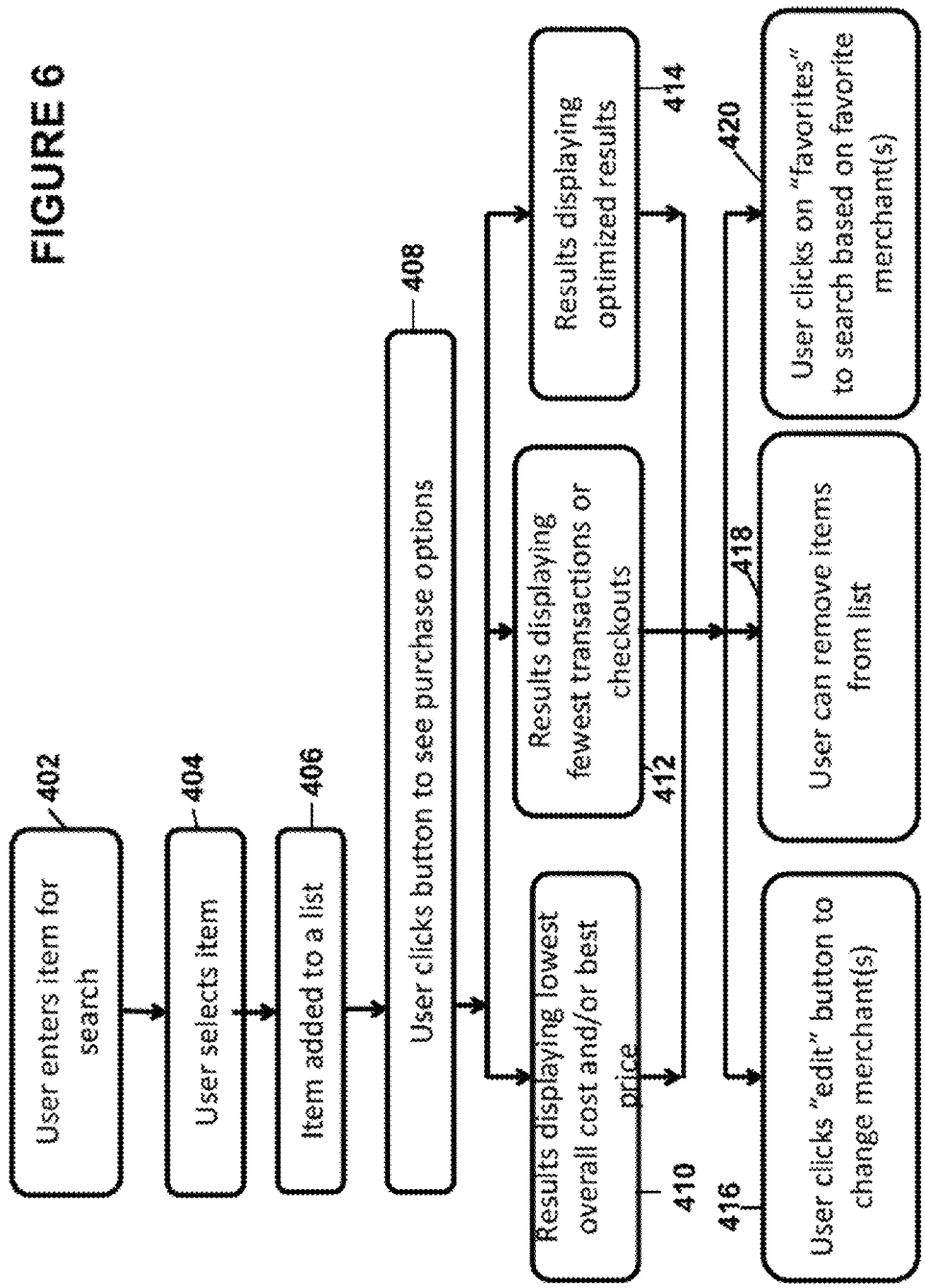
FIG. 6 illustrates an exemplary method for displaying and editing the results of a search for the items on the shopping list.

FIG. 6 illustrates details of an exemplary method for presenting alternative purchase options for the items on the shopping list. As before, the user enters the items into the form and the system 110 displays candidate items from which the user may make a selection and add to the shopping list (Steps 402, 404, 406). The user clicks to see purchase options, (step 408), and the system 110 performs computer-based calculations (described below) on the search results to provide various purchase options, such as lowest overall cost and/or best price, fewest number of transactions or checkouts, or system optimized results (Steps 410, 412, 414). The system 110 then displays the purchase options for the items on the list, based on the predefined attributes (e.g., price or cost, shipping cost, seller rating, etc.) and other criteria defined by the system 110. FIG. 17 illustrates an exemplary manner in which the results may be displayed, i.e., combinations of vendors that offer the lowest overall cost or best price, taking into account product price or cost, available discounts, sales tax and shipping costs, for each product on the user's shopping list ("lowest cost"), combinations of vendors that offer the fewest possible (i.e., lowest number of) purchase transactions or checkouts for ordering the items on the user's shopping list ("fewest checkouts"), and the combination of vendors that the system 110 determines to be the most optimal, based on, e.g., total price or cost, vendor rating, total number of transactions or checkouts, and/or any other criteria ("best combo"). System 110 may also display other purchase options, e.g., based on a preference for local or preferred vendors, least delivery time, environmentally friendly items, and the like. As further illustrated in FIG. 6, the user may edit the purchase options and select other vendors (step 416), modify the list (i.e. add or delete items from the list, step 418), or perform the search based on user's preferred ("favorite") vendors. (Step 420). The system 110 may display metrics along with each result to show, for example, the amount of money and/or time saved, or the reduction in transactions or checkouts, attributable to each purchase option, as shown, for example, in FIG. 17 (e.g., "$68 Saved," "6 Min Saved," "1 Number of Retailer Transactions").

Figure 7:
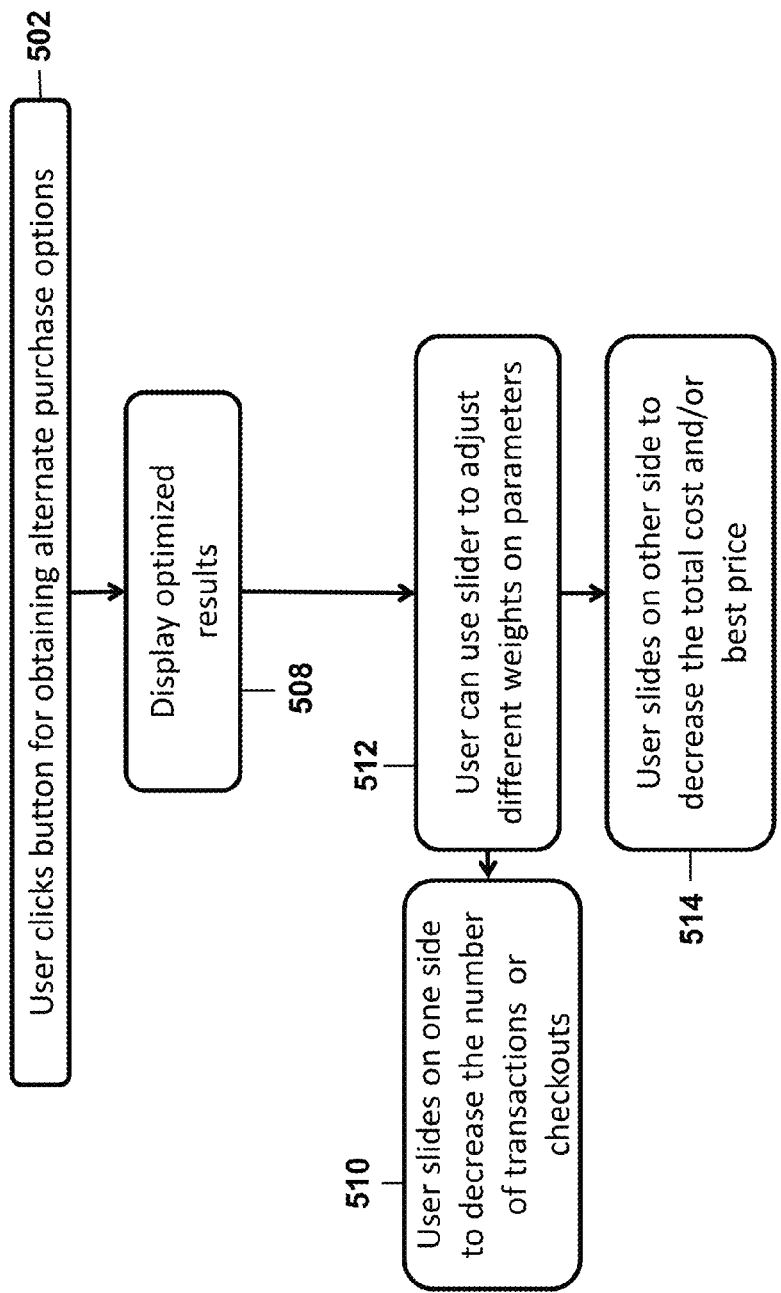
FIG. 7 illustrates an exemplary method for customizing the purchase options.

FIG. 7 illustrates details of an exemplary method by which users may customize the criteria and/or weighting applied by the system in connection with the optimized search feature (e.g., the feature shown at step 414, FIG. 6; "best combo" in FIG. 17). At step 502, after the user clicks a button such as "See prices," to view the alternative purchase options, the user may indicate that she wishes to customize the criteria for the optimized search function to provide more or less weighting to or preference for, e.g., vendors that provide the lowest cost and/or best price, or the combination of vendors that, overall, provide the fewest number of purchase transactions or checkouts (Steps 510, 514). The weighting given to, or preference for, other factors, such as a preference for local or favorite vendors, may be adjusted as well. A slider may be provided for this purpose, such as shown in FIG. 21, wherein the user may slide the weight 2104 towards one side 2102 to provide more weight to the lowest cost and/or best price and towards the other side 2106 to provide more weight to the fewest number of transactions or checkouts. Once the system 110, receives the user's adjusted weighting/preferences, the system 110 may re-perform the calculations and present new alternative purchase options to the user.

Figure 8:
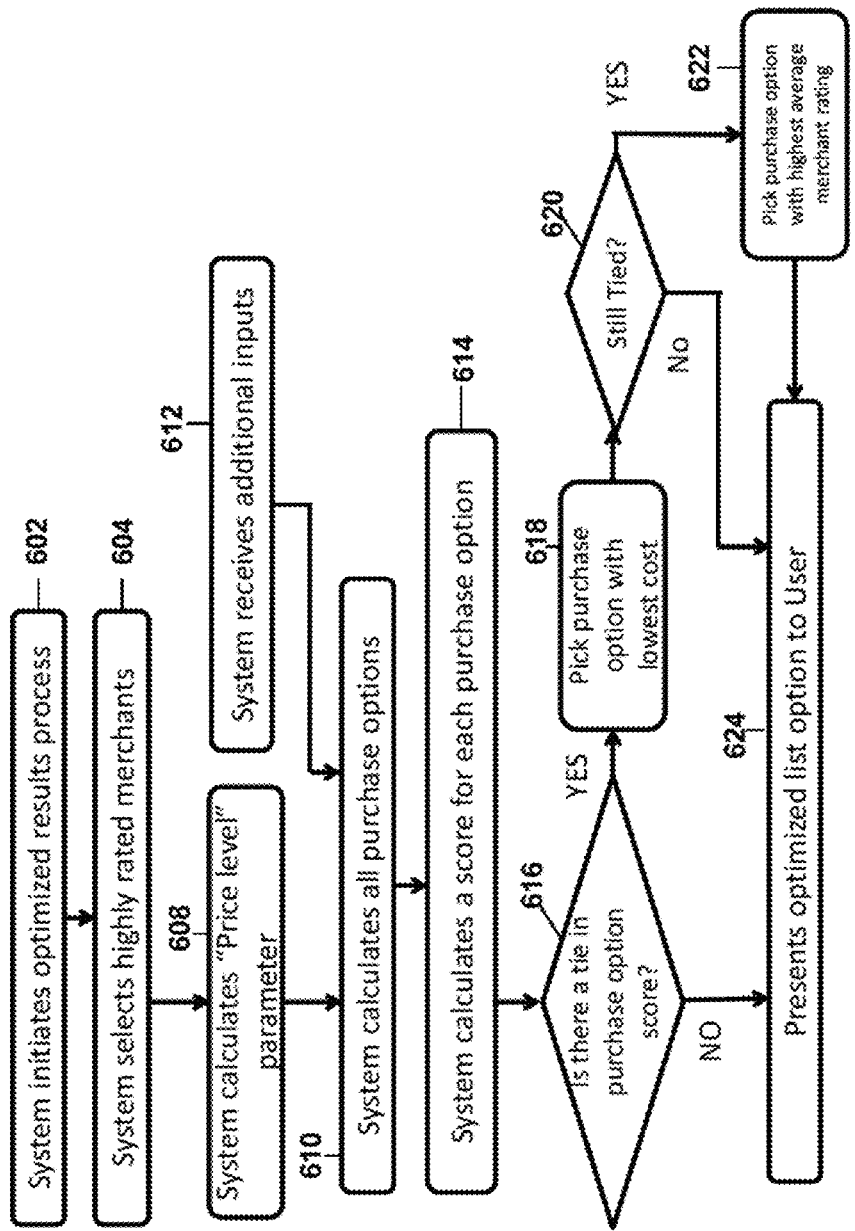
FIG. 8 illustrates an exemplary method of optimizing the search results.

FIG. 8 illustrates the details of an exemplary method for generating the system produced optimized results, i.e., the "optimized results" shown in step 414 (FIG. 6) and the "best combo" option shown in FIG. 17. After search results have been requested, the system 110 initiates the optimized results process, (step 602) and selects preferred vendors from which the items are available (Step 604). These may be vendors that have been highly rated, e.g., based on reviews from customers, or they may have been selected from a vendor list kept by the operator of system 110. The list may contain, for example, vendors with which the operator has established a business relationship, and the like. The system 110 then calculates the lowest total cost of all items in the list based on a search from different selected vendors. The system 110 then sets a "price level" parameter, which is the lowest total cost of items that it found (Step 608). The system 110 then employs additional inputs, step 612, to calculate various purchase options (Step 610). The additional inputs may include information indicative of a transaction to value ratio, a threshold level, a transaction ceiling, and the like. These additional inputs may be predetermined or the system 110 may enable the user to adjust the priority for these inputs. For example:

the transaction to value ratio may be an assigned value used to determine an appropriate trade-off between the number of transactions or checkouts needed to purchase the items and the total price or total cost of the items (i.e. a measure of a total number of transactions required for each purchase option versus a total cost for each purchase option);

the threshold level may be an assigned value used to define an acceptable percentage within which the system produced optimized results should fall relative to the lowest price/cost and fewest transactions/checkouts options to be considered an optimized option (i.e. a measure of the total cost for purchasing the items in each purchase option versus the lowest overall price/cost); and, the transaction ceiling may be a value that defines the maximum number of permitted transactions or checkouts for a result to be considered an optimized result (i.e. a measure by which each total number of transactions for purchasing the plural items exceeds a predefined value).

The system 110 then determines the possible purchase options, which is a combination of items and vendor system 104 from which the items are available. For each purchase option found, the system 110 calculates the total number of transactions or checkouts required and assigns a score to each one (Step 614). The system 110 then determines if there is a tie in the scores (Step 616). If there is a tie in the scores, then the system 110 breaks the tie by giving preference to the purchase option that provides the lowest total cost (Step 618). If it is still tied (Step 620) then the system 110 gives preference to the purchase option that contains the highest average vendor rating or contains preferred vendors (Step 622). The system 110 then presents the optimized purchase option to the user (Step 624).

Figure 9:
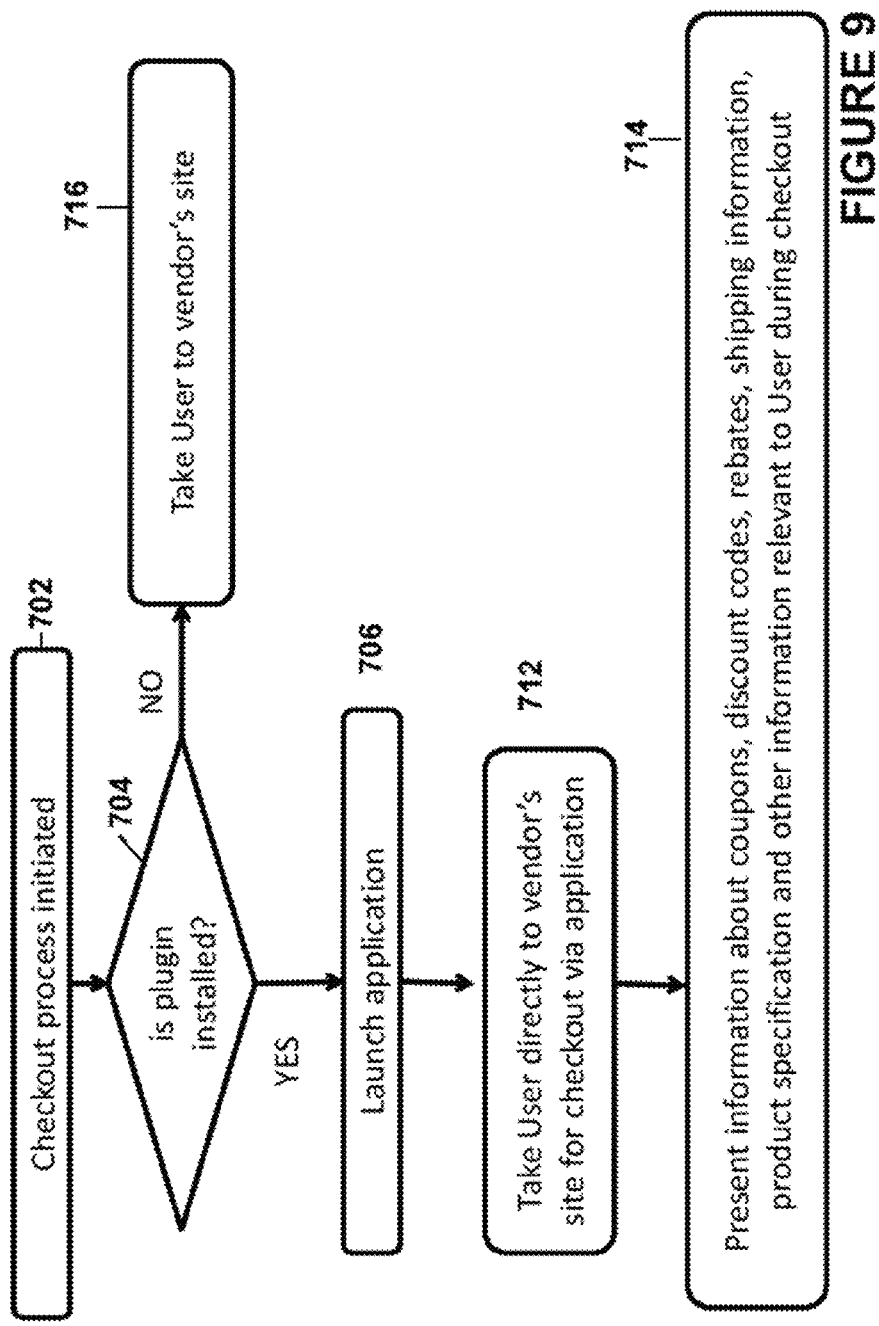
FIG. 9 illustrates an exemplary checkout method, including a plugin or browser application for aiding checkout.

FIG. 9 illustrates details of an exemplary checkout method that may be employed by the system 110. The checkout process is initiated after the user selects one of the purchase options to purchase the items on the list. (Step 702). The system 110 then determines whether a plugin or browser application, that facilitates the checkout process, has been installed on device 102. (Step 704). The plugin or browser application retrieves previously stored information such as the user's payment information (e.g., credit card details), shipping address, and the like. If no plugin or browser application has been installed, or if the plugin or browser application has not been detected, the system 110 directs the user to the vendor's system website 104 for consummating the purchase at the vendor's website by manually entering the user's shipping and payment information using the vendor's checkout system (Step 716). However, if the plugin or browser application has been installed and is detected, the plugin or browser application facilitates the checkout/purchase process and may not require the user to manually enter her shipping and/or payment information (Step 706). The plugin or browser application directs the user to the vendor's website, where the user's information may be automatically entered into the vendor's checkout system (Step 712). The plugin or browser application also retrieves and displays coupon codes, rebates, product specifications, customer ratings, and the like, and displays their availability to the user, as shown at the top of FIG. 18. (Step 714).

Figure 10:
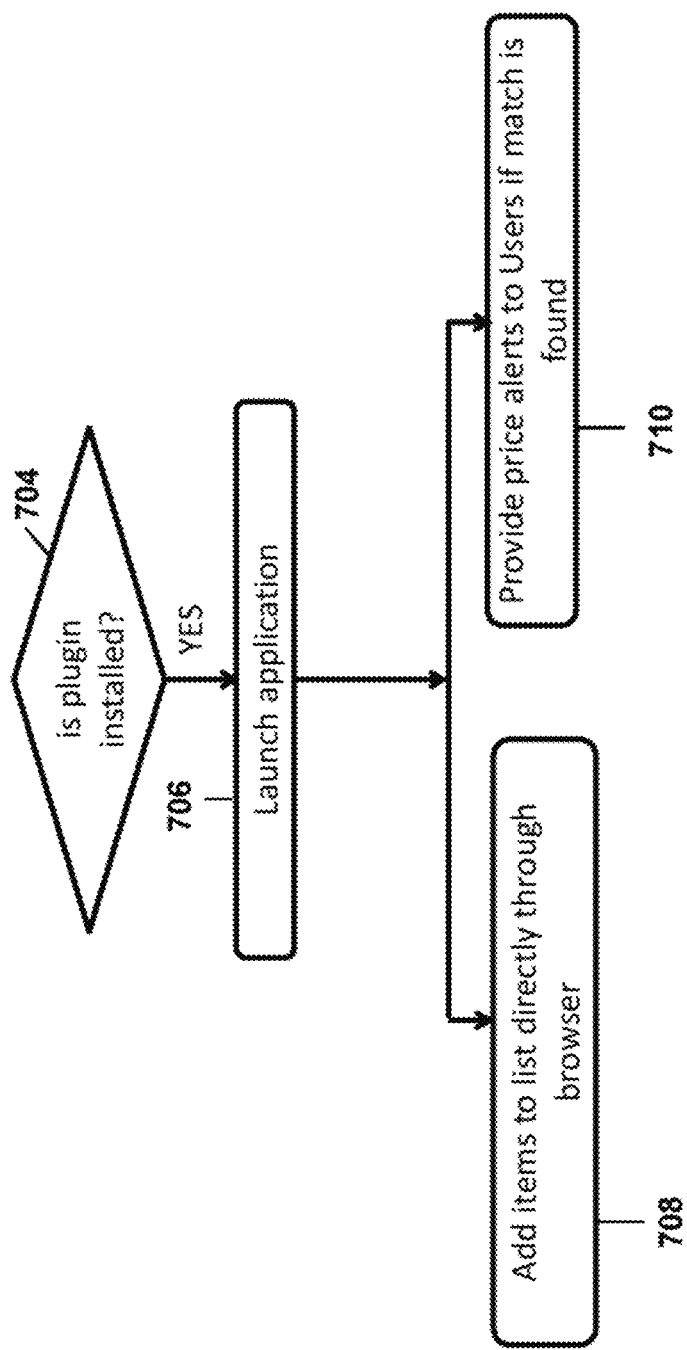
FIG. 10 illustrates an exemplary application resident on a user's Internet enabled device for adding items to a shopping list and for providing price alerts.
Figure 19:
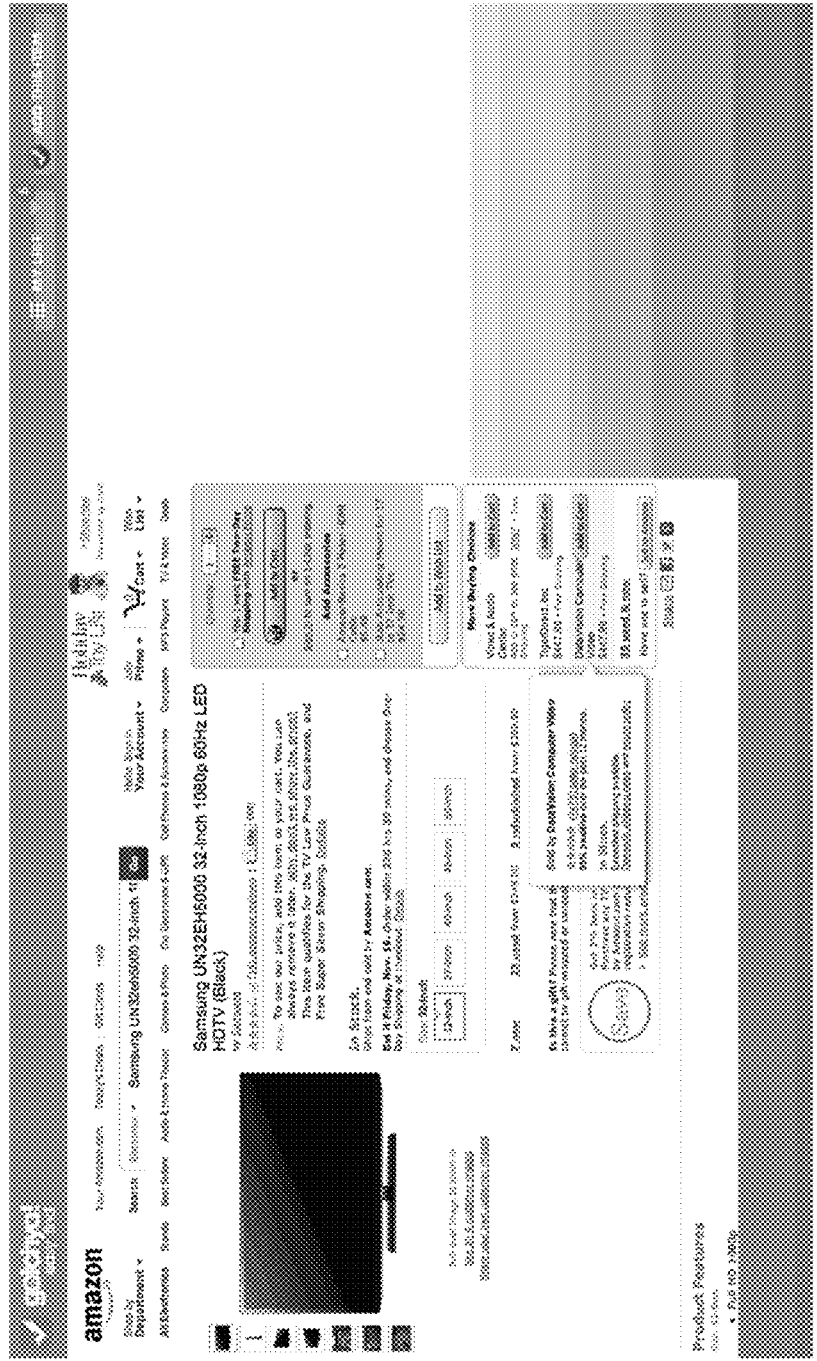
FIG. 19 is a screen shot of an exemplary web page of a web site employing a plugin or browser application for adding items to a shopping list.
Figure 20:
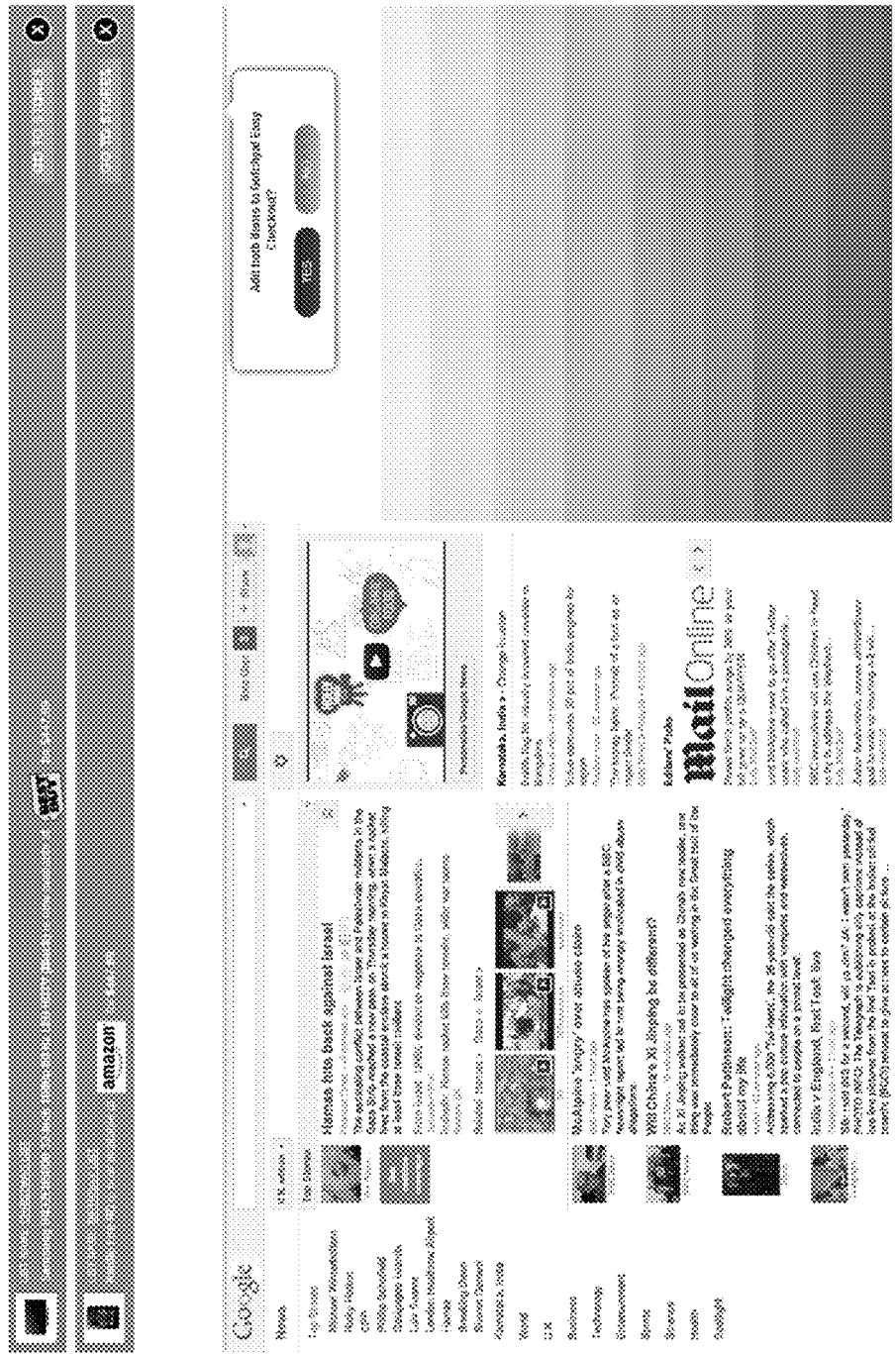
FIG. 20 is a screen shot of an exemplary web page of a web site employing a plugin or browser application for providing price alerts.

FIG. 10 illustrates details of another exemplary plugin or browser application for facilitating the method described herein. In particular, the plugin or browser application of FIG. 10 enables the user to add items to the shopping list while browsing (i.e., without the need to navigate away from or minimize the current browser page, step 708), and/or to set and provide price alerts for items in the shopping list (step 710). The exemplary screen shot of FIG. 19 illustrates that a user is browsing amazon.com and is presently on a page for a Samsung TV. As shown in FIG. 19, the method of the present invention runs in the background as the user browses the internet, such as amazon.com, and the internet page that the user is browsing is juxtaposed to a display provided by the method that includes "My List" and "Add This Item." The user may click on the "Add This Item" button shown in the upper right hand corner (and which is provided by the plugin or browser application) to add the item to the shopping list on system 110. When the user clicks "Add This Item," the item that is currently on display on the browser is added to the user's shopping list in the system 110. For example, if the user browses amazon.com and comes upon an item, such as a Samsung UN32EH5000 32-inch 1080p 60 Hz LED HDTV and clicks "Add This Item," the item "Samsung UN32EH5000 32-inch 1080p 60 Hz LED HDTV" is directly added to the user's shopping list in the system 110. The system 110 will then determine and present purchase options when the user wishes to search for or purchase the items on the list. Alternatively, the specialized application running on the device 102, may be used to add an item to the list by dragging an image, or text data directly to the application. For example, if the user sees a TV when browsing the shelves of a Best Buy store, she can take a picture of the TV, or of the bar code or QR code, and add the picture or code directly to the application or she can take a picture of the TV, bar code or QR code and click the "Add This Item" button from the application on the device 102. In another example, if the user is browsing amazon.com from the device 102, she can drag the image or text or hyperlink directly to the application or click on "Add This Item" button when browsing the website. The exemplary screen shot of FIG. 20 illustrates (upper left hand corner) that a user is browsing news.google.com and, the plugin or browser application has provided an indication that a price match has been found for an item(s) already in the shopping list. As shown in FIG. 20, the method of the present invention runs in the background as the user browses the internet, such as news.google.com, and the internet page that the user is browsing is juxtaposed on a display provided by the method that includes "Go To Stores." The system 110 maintains information regarding the current prices of the item available from vendor system 104. When a better price than previously obtained for an item on the list appears, the system 110 alerts the user through the plugin or browser application, via e-mail, via text, or any other communication method. The user may also provide to the system 110 a desirable price or cost at which she wishes to purchase the item. The system 110 will use the plugin or browser application to alert the user through the plugin or browser application if the price/cost (or a lower one) becomes available. The plugin or browser application enables the user to go to the vendor 104's website to consummate the purchase.

Figure 11:
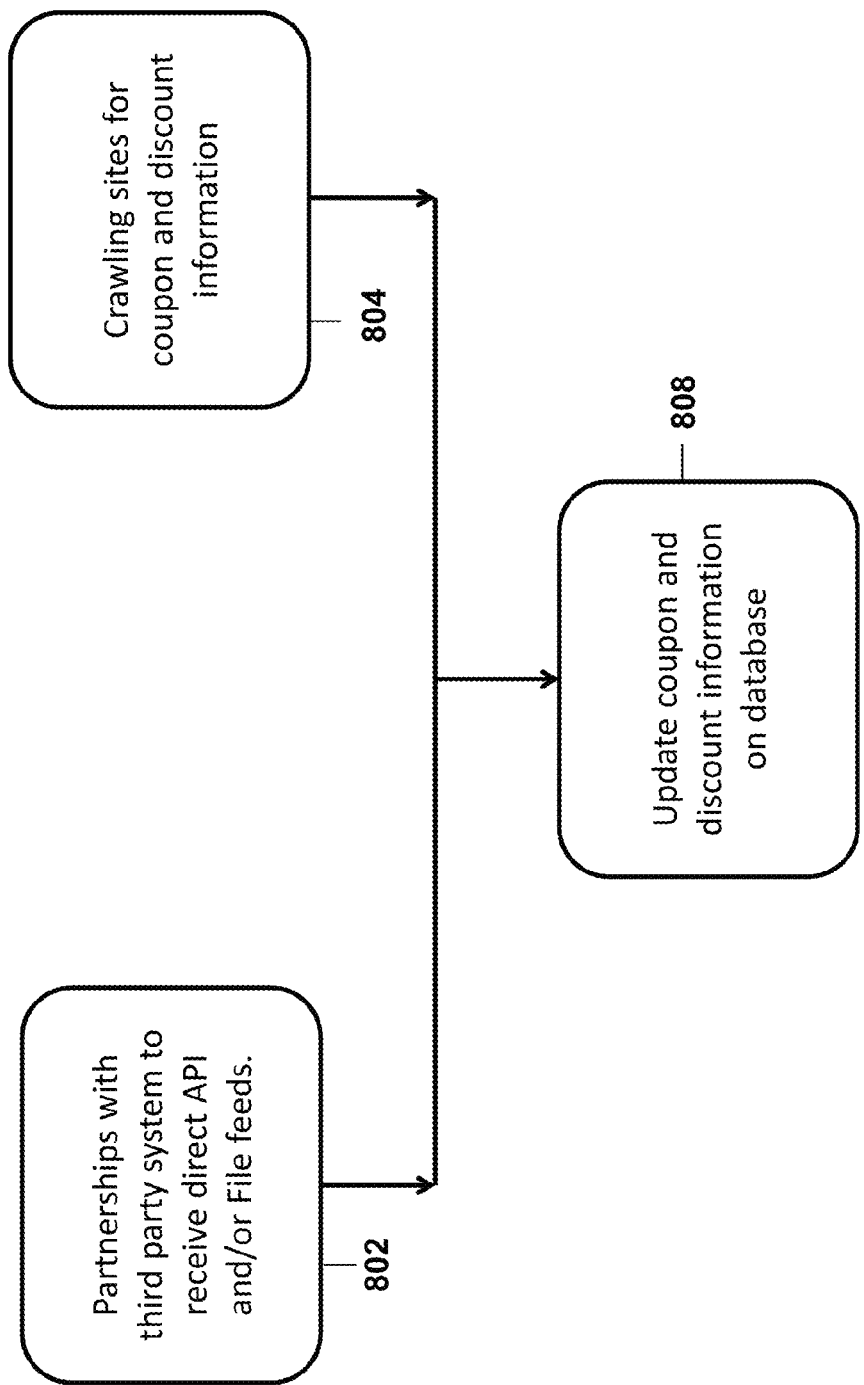
FIG. 11 illustrates an exemplary method for obtaining rebate and coupon information for items selected by a user.

FIG. 11 illustrates exemplary details of a process for obtaining and updating rebate and coupon information for items that may be offered for sale to the user via system 110. The system 110 may obtain information about coupons, discounts, rebates and other information that reduce the price of the product through partnerships with the operators of the vendor systems 104 and/or third party systems 108 via techniques such as an API, FTP feed, or the like (Step 802). The system 110 may also crawl the vendor systems 104 and/or third party systems 108 to obtain coupon, rebate, discount, etc. information for the items (Step 804). Based on processes 802 and 804, the system 110 may update the information about coupons, rebates, discounts, and the like for display to the user. (Step 808).

Figure 12:
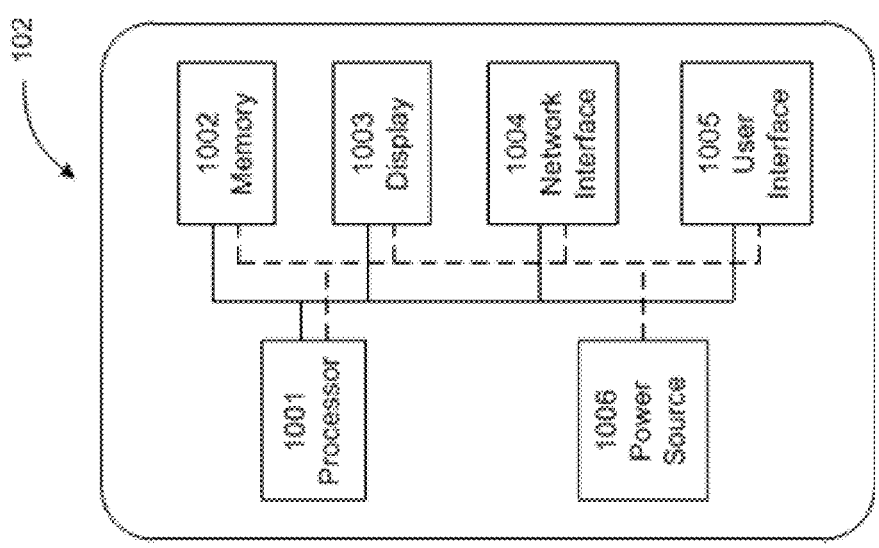
FIG. 12 illustrates exemplary hardware details of an Internet enabled device that may be used in connection with the present invention.

FIG. 12 depicts exemplary hardware details of device 102. Device 102 may be a computer, such as a desktop computer or laptop computer, a tablet Internet enabled device, a cell phone, a handheld Internet enabled device or any other type of Internet enabled device. As is common, the device may include a processor 1001 that is able to execute instructions stored in one or more memories 1002. Processor 1001 may generate information on a display component 1003. Display component 1003 may include a display driver, a display card, display 102 or any other hardware and/or software required to display an image or series of images. The device 102 may also include a network interface 1004 that allows the device to send and receive information signals via a network. Network interface 1004 may include any type of network adapter for connecting to a network, such as an adapter to establish a connection to the Internet, to a wired or wireless intranet, to a cellular network or to a wireless network. Device 102 may also include a user interface 1005. User interface 1005 may include one or more external components, such as an external keyboard, external mouse, external microphone, external speaker, and the like. Device 102 may include at least one power source 1006. Power source 1006 may provide power to any or all of the other components in Internet enabled device 102. Power source 1006 may be connected to, and provide power to, each of processor 1001, memory 1002, display 1003, network interface 1004 and user interface 1005. Power source 1006 may be any type of power source, such as one or more disposable batteries, a rechargeable battery and the like.

Figure 13:
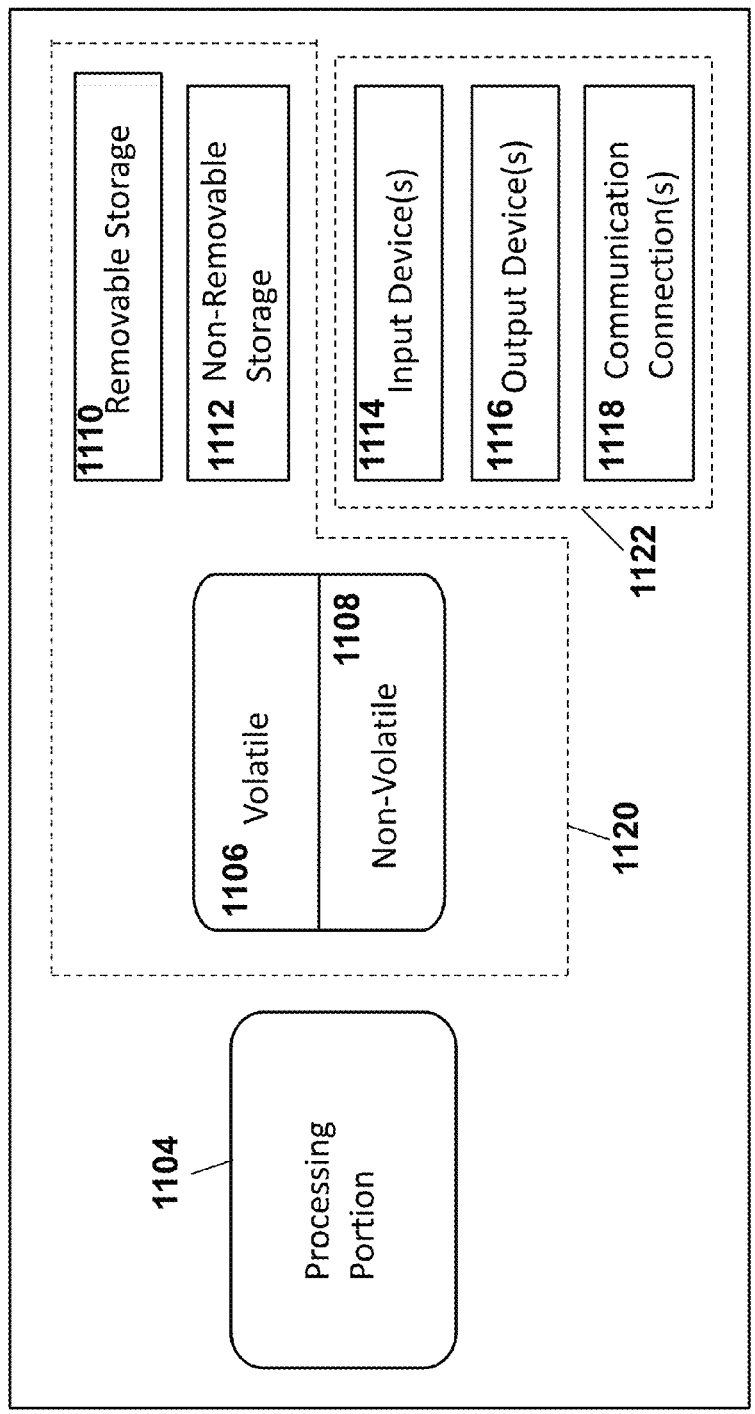
FIG. 13 illustrates exemplary details of the hardware that may be employed to implement the system shown in FIG. 3.

FIG. 13 illustrates exemplary hardware details commonly employed by vendor systems 104 and third party system 108, and that may be employed for system 110. The systems may comprise a processing portion 1104, a memory portion 1120, and an input/output portion 1120. The processing portion 1104, memory portion 1120, and input/output portion 1120 are coupled together to allow communications there between. The input/output portion 1120 may be capable of receiving and/or providing information from/to the device 102 and/or other network entities configured to be utilized with online searching and purchasing of multiple items. For example, the input/output portion 1120 may include a wireless communications (e.g., 2.5G/3G/4G/GPS) card. The input/output portion 1120 may be capable of receiving and/or sending video information, audio information, control information, image information, data, or any combination thereof. In various configurations, the input/output portion 1120 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, and the like, or a combination thereof.

The foregoing method and system presents one preferred embodiment of the present invention. It should be appreciated that there are many alternative embodiments within the scope of the present invention. While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed:

1. A method for enhancing the experience of a user employing an internet enabled device to search, via a shopping website, for items that the user desires to purchase, and direct the user to on-line vendor websites for purchasing at least a portion of the items searched via the shopping website, wherein the internet enabled device is equipped with a web browser, including a browser application, capable of (i) displaying a form for a user to enter first information descriptive of the items that the user wishes to search for and (ii) directing the web browser to the on-line vendor websites for consummating purchase of the items from the on-line vendors, comprising:
- i) receiving the first information at an on-line server associated with the shopping website;
- ii) searching, via the server and for each item for which corresponding first information was received, for a plurality of candidate items corresponding to each first information and that are available for purchase from the on-line vendors;
- iii) sending to the internet enabled device, via the server, second information indicative of the plurality of candidate items and providing an opportunity for the user to review each of the plurality of candidate items and to select, from within each of the plurality of candidate items a corresponding specific candidate item;
- iv) maintaining third information indicative of an item list identifying the specific candidate items that the user has selected;
- v) repeating at least a portion of (iii) until the user has selected a specific candidate item corresponding to each first information;
- vi) at the server, analyzing the item list and determining, based on the analysis of the item list performed by the server and predefined criteria, a plurality of options available for purchasing the items on the item list from the on-line vendors;
- vii) providing on the internet enabled device, an opportunity for the user to select a purchase option;
- viii) receiving at the server a selection by the user via the web browser of the purchase option; and,
- ix) directing the web browser to the on-line vendor websites for consummating purchase of the items according to the user selection of the purchase option such that web pages for the on line vendors are juxtaposed a web page of the shopping website.

2. The method of claim 1 wherein the server searches for the plurality of candidate items as each first information is entered.

3. The method of claim 1 wherein the server performs (ii) and (iii) as each first information is entered.

4. The method of claim 1 wherein the form allows the user to enter the first information as a single entry indicative of multiple items to be searched or purchased, and the server searches for the plurality of candidate items for each of the items indicated by the first information.

5. The method of claim 1 wherein the first information is one of a photo, a link, a QR code or text data descriptive of items that the user wishes to search for or purchase.

6. The method of claim 1 wherein the item list is stored on one of the server or a database remote from the user.

7. The method of claim 1 wherein the item list is stored on the internet enabled device.

8. The method of claim 1 wherein at least one of the plurality of purchase options identifies potential on-line vendors and the potential on-line vendors are identified based on on-line vendor ratings.

9. The method of claim 1 wherein the plurality of purchase options are editable so as to permit selection of various on-line vendors.

10. The method of claim 1 wherein the first information is provided via one of the form, e-mail, or social media.

11. The method of claim 1 wherein rebate information is displayed with the plurality of candidate items.

12. The method of claim 1 wherein rebate information is displayed along with one of the plurality of purchase options.

13. The method of claim 1 wherein the server determines a lowest overall cost for each specific candidate item on the item list independently of the number of vendors required to purchase all of the specific candidate items at a lowest overall cost for all items on the item list.

14. The method of claim 1 wherein the server determines at least one of the plurality of purchase options based on a fewest number of transactions required to purchase all of the specific candidate items on the item list.

15. The method of claim 1 wherein the server determines at least one of the plurality of purchase options using an optimization process that employs both a cost of each specific candidate item on the item list and a number of transactions required to purchase all of the specific candidate items on the item list.

16. The method of claim 1 further comprising sharing, via the server, the item list for access and editing by parties other than the user.

17. The method of claim 1 further comprising, at the server, in response to the user employing a pointer to hover over a candidate item, causing to be displayed to the user fourth information indicative of details of a candidate item.

18. The method of claim 17 wherein the fourth information comprises at least one of a model number, a product review, cost, associated on-line vendors, rebate information, product rating, or an image.

19. A computer readable storage medium comprising computer readable executable instructions to be carried out by a server hosting a shopping website for enhancing the experience of a user employing an internet enabled device to search, via the shopping website, for items that the user desires to purchase, and direct the user to on-line vendor websites for purchasing at least a portion of the items searched via the shopping website, wherein the internet enabled device is equipped with a web browser, including a browser application, capable of (i) displaying a form for a user to enter first information descriptive of the items that the user wishes to search for and (ii) directing the web browser to the on-line vendor websites for consummating purchase of the items from the on-line vendors, the instructions, when executed, causing the server to:
- i) receive the first information;
- ii) for each item for which corresponding first information was received, search for a plurality of candidate items corresponding to each first information and that are available for purchase from on-line vendors;
- iii) send to the internet enabled device second information indicative of the plurality of candidate items and provide an opportunity for the user to review each of the plurality of candidate items and to select, from within each of the plurality of candidate items a corresponding specific candidate item;
- iv) maintain third information indicative of an item list identifying the specific candidate items that the user has selected;
- v) repeat at least a portion of (iii) until the user has selected a specific candidate item corresponding to each first information;
- vi) analyze the item list and determine, based on the analysis of the item list performed and predefined criteria, a plurality of options available for purchasing the items on the item list from the on-line vendors;
- vii) provide to the internet enabled device an opportunity for the user to select a purchase option;
- viii) receive a selection by the user of the purchase option via the web browser; and, ix) direct the web browser to the on-line vendor websites for consummating purchase of the items according to the user selection of the purchase option such that web pages for the on line vendors are juxtaposed a web page of the shopping website.

20. The storage medium of claim 19 wherein code causes the server to determine at least one of the plurality of purchase options based on: (i) a lowest overall cost for each specific candidate item on the item list independently of the number of vendors required to purchase all of the specific candidate items at a lowest overall cost for all items on the item list; (ii) fewest number of transactions required to purchase all of the specific candidate items on the item list; or (iii) an optimization process that employs both a cost of each specific candidate item on the item list and a number of transactions required to purchase all of the specific candidate items on the item list.

21. The system of claim 19 wherein at least one of the plurality of purchase options identifies potential on-line vendors and the potential on-line vendors are identified based on on-line vendor ratings.

22. The system of claim 19 wherein the server is further programmed to determine at least one of the plurality of purchase options based on a lowest overall cost for each specific candidate item on the item list independently of the number of vendors required to purchase all of the specific candidate items at a lowest overall cost for all items on the item list.

23. The system of claim 19 wherein the server is further programmed to determine at least one of the plurality of purchase options based on a fewest number of transactions required to purchase all of the specific candidate items on the item list.

24. The system of claim 19 wherein the server is further programmed to determine at least one of the plurality of purchase options using an optimization process that employs both a cost of each specific candidate item on the item list and a number of transactions required to purchase all of the specific candidate items on the item list.

25. A system for enhancing the experience of a user employing an internet enabled device to search, via a shopping website, for items that the user desires to purchase, and direct the user to on-line vendor websites for purchasing at least a portion of the items searched via the shopping website, wherein the internet enabled device is equipped with a web browser, including a browser application capable of (i) displaying a form for a user to enter first information descriptive of the items that the user wishes to search for and (ii) directing the web browser to the on-line vendor websites for consummating purchase of the items from the on-line vendors, the server comprising computer executable code that causes the server to:
  i) receive the first information;
  ii) for each item for which corresponding first information was received, search for a plurality of candidate items corresponding to each first information and that are available for purchase from on-line vendors;
  iii) send to the internet enabled device second information indicative of the plurality of candidate items and provide an opportunity for the user to review each of the plurality of candidate items and to select, from within each of the plurality of candidate items a corresponding specific candidate item;
  vi) maintain third information indicative of an item list identifying the specific candidate items that the user has selected;
  v) repeat at least a portion of (iii) until the user has selected a specific candidate item corresponding to each first information;
  vi) analyze the item list and determine, based on the analysis of the item list and predefined criteria, a plurality of options available for purchasing the items on the item list from the on-line vendors;
  vii) provide to the internet enabled device an opportunity for the user to select a purchase option;
  viii) receive a selection by the user of the purchase option via the web browser; and,
  ix) direct the web browser to the on-line vendor websites for consummating purchase of the items according to the user selection of the purchase option such that web pages for the on line vendors are juxtaposed a web page of the shopping website.

* * * * *

UNITED STATES PATENT AND TRADEMARK OFFICE
CERTIFICATE OF CORRECTION

| | | |
|---|---|---|
| PATENT NO. | : 9,224,167 B2 | Page 1 of 1 |
| APPLICATION NO. | : 13/840511 | |
| DATED | : December 29, 2015 | |
| INVENTOR(S) | : Keith L. Lampert | |

It is certified that error appears in the above-identified patent and that said Letters Patent is hereby corrected as shown below:

Title Page,
In the Title (54), delete the misprint of the title as it appears and insert -- SYSTEM AND METHOD FOR AIDING A USER IN ONLINE SEARCHING AND PURCHASING OF MULTIPLE ITEMS --.

In the Specification,

Column 1,
Lines 1-3, delete the misprint of the title as it appears and insert -- SYSTEM AND METHOD FOR AIDING A USER IN ONLINE SEARCHING AND PURCHASING OF MULTIPLE ITEMS --.

In the Claims,

Column 15,
Claim 20, line 6, delete "code causes" and insert -- the instructions cause --.

Signed and Sealed this
Twelfth Day of April, 2016

Michelle K. Lee
*Director of the United States Patent and Trademark Office*

UNITED STATES PATENT AND TRADEMARK OFFICE
CERTIFICATE OF CORRECTION

PATENT NO. : 9,224,167 B2
APPLICATION NO. : 13/840511
DATED : December 29, 2015
INVENTOR(S) : Keith L. Lampert It is certified that error appears in the above-identified patent and that said Letters Patent is hereby corrected as shown below:

In the Claims

*Column 15*

Claim 20, line 6, renumber claim "20" to be claim --21--; delete dependency "19" and substitute therefor --20--.

Claim 21, line 18, renumber claim "21" to be claim --22--; delete dependency "19" and substitute therefor --20--.

Claim 22, line 22, renumber claim "22" to be claim --23--; delete dependency "19" and substitute therefor --20--.

Claim 23, line 29, renumber claim "23" to be claim --24--; delete dependency "19" and substitute therefor --20--.

Claim 24, line 34, renumber claim "24" to be claim --25--; delete dependency "19" and substitute therefor --20--.

Claim 25, line 40, renumber claim "25" to be claim --20--.

Signed and Sealed this
Fourteenth Day of June, 2016

Michelle K. Lee
*Director of the United States Patent and Trademark Office*